(12) United States Patent
Lumanog et al.

(10) Patent No.: US 12,476,461 B2
(45) Date of Patent: Nov. 18, 2025

(54) CIRCUITS FOR PHOTOVOLTAIC APPLICATIONS

(71) Applicant: Portable Electric Ltd., Vancouver (CA)

(72) Inventors: Glenn Lumanog, Surrey (CA); Mathew Brant Morrow, North Vancouver (CA); Allen Upward, Vancouver (CA)

(73) Assignee: Portable Electric Ltd., Vancouver (CA)

( * ) Notice: Subject to any disclaimer, the term of this patent is extended or adjusted under 35 U.S.C. 154(b) by 0 days.

(21) Appl. No.: 18/527,202

(22) Filed: Dec. 1, 2023

(65) Prior Publication Data

US 2024/0186790 A1 Jun. 6, 2024

Related U.S. Application Data

(60) Provisional application No. 63/429,535, filed on Dec. 1, 2022.

(51) Int. Cl.
*H02J 3/00* (2006.01)
*H02J 3/38* (2006.01)

(52) U.S. Cl.
CPC ............ *H02J 3/00125* (2020.01); *H02J 3/38* (2013.01); *H02J 2300/24* (2020.01)

(58) Field of Classification Search
CPC ....... H02J 3/00125; H02J 3/38; H02J 2300/24
See application file for complete search history.

(56) References Cited

U.S. PATENT DOCUMENTS

| 4,752,852 A | 6/1988 | Ahl et al. |
| 5,672,952 A | 9/1997 | Szepesi |

(Continued)

FOREIGN PATENT DOCUMENTS

EP    2284841 A1    2/2011

OTHER PUBLICATIONS

Basic Electrical Characteristics and Application Circuit Design of Photovoltaic Couplers for MOSFET Drive for Relays, Toshiba Electronic Devices & Storage Corporation, 2019.

(Continued)

*Primary Examiner* — Lincoln D Donovan
*Assistant Examiner* — Alex W Lam
(74) *Attorney, Agent, or Firm* — Todd A. Rattray; Oyen Wiggs Green & Mutala LLP

(57) ABSTRACT

An electrical transmission safety system for connection of direct current (DC) power from a DC power source to a load comprises: a connection from the power source to the load, the connection comprising a positive terminal and a negative terminal; a first solid state switch electrically connected between the power source and one of the positive terminal and negative terminal; and a switch-control isolation block comprising a first optocoupler, the first optocoupler providing electrical isolation from the power source for generating a first isolated switch-control signal in response to a switch-control input signal, the switch-control isolation block connected to provide the first isolated switch-control signal to the first solid state switch to thereby control an ON or OFF conduction state of the first solid state switch and corresponding current flow between the power source and the load through the one of the positive terminal and negative terminal.

15 Claims, 19 Drawing Sheets

(56) References Cited

U.S. PATENT DOCUMENTS

| | | | |
|---|---|---|---|
| 5,726,505 | A | 3/1998 | Yamada et al. |
| 6,060,943 | A | 5/2000 | Jansen |
| 6,301,133 | B1 | 10/2001 | Cuadra et al. |
| 6,462,926 | B1 | 10/2002 | Zaretsky et al. |
| 6,469,564 | B1 | 10/2002 | Jansen |
| 6,594,163 | B2 | 7/2003 | Tsai |
| 7,394,633 | B2 | 7/2008 | Sasitornwannakul et al. |
| 7,636,011 | B2 | 12/2009 | Frederick et al. |
| 8,183,715 | B2 | 5/2012 | Hanawa et al. |
| 8,508,078 | B2 | 8/2013 | Posat |
| 8,842,397 | B2 | 9/2014 | Fahrenbruch et al. |
| 9,105,765 | B2 | 8/2015 | Fornage |
| 9,369,126 | B1 | 6/2016 | Dunton et al. |
| 9,496,710 | B2 | 11/2016 | Narla et al. |
| 9,660,544 | B1 | 5/2017 | Telefus et al. |
| 9,812,869 | B2 | 11/2017 | Narla |
| 10,038,317 | B1 | 7/2018 | McCracken et al. |
| 10,175,727 | B2 | 1/2019 | Yu et al. |
| 10,230,310 | B2 | 3/2019 | Loewenstern et al. |
| 11,356,012 | B2 | 6/2022 | Liu et al. |
| 2001/0024108 | A1 | 9/2001 | Tamura |
| 2005/0253642 | A1 | 11/2005 | Chen |
| 2006/0044709 | A1 | 3/2006 | Seiersen |
| 2006/0244408 | A1* | 11/2006 | Feil ............... H02H 11/00 318/459 |
| 2009/0147420 | A1 | 6/2009 | Graf et al. |
| 2011/0163797 | A1 | 7/2011 | Posat |
| 2013/0049710 | A1 | 2/2013 | Kraft et al. |
| 2013/0257383 | A1* | 10/2013 | Shim ............... H02J 7/0048 324/426 |
| 2014/0265638 | A1 | 9/2014 | Orr et al. |
| 2015/0381111 | A1 | 12/2015 | Nicolescu et al. |
| 2016/0036235 | A1 | 2/2016 | Getsla |
| 2016/0079878 | A1* | 3/2016 | Lin ............... H02M 3/33507 363/21.14 |
| 2017/0207620 | A1* | 7/2017 | Zhu ............... H01L 31/02021 |
| 2020/0052688 | A1* | 2/2020 | Orozco ............... H03K 17/6871 |
| 2022/0103005 | A1* | 3/2022 | Ickes ............... H02J 3/0073 |

OTHER PUBLICATIONS

Mastervolt. US battery isolator—catalog p. 0072, 2022.
PICOR White Paper, "Active-ORing Solutions in Redundant Power System Architectures", Rev. 1.0, VICORPOWER.com, 2011.

* cited by examiner

CIRCUITS FOR PHOTOVOLTAIC APPLICATIONS

REFERENCE TO RELATED APPLICATIONS

This disclosure claims the benefit under 35 USC 119 in relation to U.S. application No. 63/429,535 filed 1 Dec. 2022, which is hereby incorporated herein by reference.

TECHNICAL FIELD

This disclosure relates to photovoltaic systems and more specifically to systems for decoupling a photovoltaic circuit to mitigate the risk of electrical shock and undesired current discharge within a photovoltaic energy production and/or distribution system.

BACKGROUND

There is a general desire to connect photovoltaic (PV) panels in series in solar energy applications so as to increase total output voltage when the cells are aggregated. Increasing the total output voltage assists to reduce the required output current for achieving a given power output level, and hence reduces the need for large cross sectional area conductors and associated components for conducting said output current. However, such series connections can result in cumulative output voltages that are hazardous to humans; these high output voltages can lead to harmful and potentially fatal electric shock. For example, voltages of 100 VDC or higher are easily achieved in series connections of several panels of solar cells, wherein each panel may have a nominal output voltage of at least 12 VDC. Some modern photovoltaic panels may have open circuit voltages as high as 50 VDC or more, increasing the voltage of any series connections of such panels and the potential for dangerous electric shock. Application scenarios where such shock hazards exist include solar farms as well as smaller scale and portable installations of multiple solar panels.

High total voltages also present increased risk of dielectric breakdown with resultant arcing and sparks which may be hazardous to users in their own right and which may be potential causes of fires. Furthermore, high output voltages may make electrical product safety certification more difficult.

There is, for these and other reasons, a general desire to provide an electrically isolated, fast acting switching circuit that will allow DC voltage sources (such as photovoltaic panels) to be rapidly disconnected from an output (e.g. a load) either on demand or when triggered automatically by a detection system. There is a general desire that such disconnection circuit permit disconnection without sparking or arcing. There is a general desire that such disconnection circuit isolate the output (e.g. the load) and mitigate the risk of dangerous electric shock or arcing if conductors in the circuit are touched by a human being or if voltages applied at said conductors could otherwise result in undesired electrical current discharge.

There is a desire to provide temporary, portable and/or reusable solar power in the form of photovoltaic panels and associated circuitry to facilitate use at various and/or multiple locations, such as, by way of non-limiting example, to provide solar power at multiple different job sites. For use in such temporary, portable and/or reusable applications, there are general desires that various connections to the photovoltaic panels be easy, non-time-consuming and safe to connect/disconnect (e.g. even for unskilled operators, who may be the users of such solar power equipment). These desires for temporary, portable and/or reusable applications contrast with typical fixed solar installations, where solar power equipment is installed by skilled technicians (rather that by users of such solar power equipment) and disconnection (e.g. to move the equipment to a new location) is not typically a concern. Further, where such temporary solar power installations are used repeatedly, there is a desire that such solar equipment be robust and safe when subject to multiple installations, teardowns and travel between locations.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides an electrical transmission safety system for connection of direct current (DC) power from a DC power source to a load. The system comprises: a connection from the power source to the load, the connection comprising a positive terminal and a negative terminal; a first solid state switch electrically connected between the power source and one of the positive terminal and negative terminal; and a switch-control isolation block comprising a first optocoupler, the first optocoupler providing electrical isolation from the power source for generating a first isolated switch-control signal in response to a switch-control input signal, the switch-control isolation block connected to provide the first isolated switch-control signal to the first solid state switch to thereby control an ON or OFF conduction state of the first solid state switch and corresponding current flow between the power source and the load through the one of the positive terminal and negative terminal.

The system may comprise a second solid state switch electrically connected between the power source and the other one of the positive terminal and negative terminal.

The switch-control isolation block may be configured to generate a second isolated switch-control signal in response to the switch-control input signal and may be connected to provide the second isolated switch-control signal to the second solid state switch to thereby control an ON or OFF conduction state of the second solid state switch and corresponding current flow between the power source and the load through the other one of the positive terminal and negative terminal.

The connection between the power source and the load may be effected by a releasably connectable cable. The switch-control input signal may be provided to the switch-control isolation block in response to the releasably connectable cable being physically connected to the load.

Physical disconnection of the releasably connectable cable from the load may disrupt the switch-control input signal, thereby causing the switch-control isolation block to cause the first isolated switch-control signal to turn the first solid state switch to an OFF (non-conducting) state.

The switch-control input signal may be received at the switch-control isolation block via the releasably connectable cable. The switch-control input signal may be received at the switch-control isolation block from the load.

A detected presence of a person within an unsafe space may disrupt the switch-control input signal, thereby causing the switch-control isolation block to cause the first isolated switch-control signal to turn the first solid state switch to an OFF (non-conducting) state.

Detection of a problematic state by a switch, camera or sensor may disrupt the switch-control input signal, thereby causing the switch-control isolation block to cause the first isolated switch-control signal to turn the first solid state switch to an OFF (non-conducting) state.

Another aspect of the invention provides a photovoltaic array circuit comprising: a first electrical transmission safety system for connection of a first photovoltaic cell to a load, the first electrical transmission safety system comprising: a first connection from the first photovoltaic cell to the load, the first connection comprising a positive terminal; a first solid state switch electrically connected between the first photovoltaic cell and the positive terminal; and a first switch-control isolation block comprising a first optocoupler, the first optocoupler providing electrical isolation from the first photovoltaic cell for generating a first isolated switch-control signal in response to a switch-control input signal, the first switch-control isolation block connected to provide the first isolated switch-control signal to the first solid state switch to thereby control an ON or OFF conduction state of the first solid state switch and corresponding current flow between the first photovoltaic cell and the load through the positive terminal; a second electrical transmission safety system for connection of a second photovoltaic cell to the load, the second electrical transmission safety system comprising: a second connection from the second photovoltaic cell to the load, the second connection comprising a negative terminal; a second solid state switch electrically connected between the second photovoltaic cell and the negative terminal; and a second switch-control isolation block comprising a second optocoupler, the second optocoupler providing electrical isolation from the second photovoltaic cell for generating a second isolated switch-control signal in response to the switch-control input signal, the second switch-control isolation block connected to provide the second isolated switch-control signal to the second solid state switch to thereby control an ON or OFF conduction state of the second solid state switch and corresponding current flow between the second photovoltaic cell and the load through the negative terminal. The first photovoltaic cell is connected to output a first DC potential between a first positive node connected to the first solid state switch on a side of the first solid state switch opposite the positive terminal and a first negative node. The second photovoltaic cell is connected to output a second DC potential between a second negative node connected to the second solid state switch on a side of the second solid state switch opposite the negative terminal and a second positive node. The first negative node is electrically connected to the second positive node.

The circuit may comprise a low-side reverse current limiter circuit connected between the second solid state switch and the negative terminal to prevent reverse current flow between the second solid state switch and the negative terminal (e.g. reverse current flow from the second solid state switch to the negative terminal).

The circuit may comprise a high-side reverse current limiter circuit connected between the first solid state switch and the positive terminal to prevent reverse current flow between the first solid state switch and the positive terminal (e.g. reverse current flow from the positive terminal to the first solid state switch).

The circuit may comprise a low-side reverse current limiter circuit connected between the negative terminal and the load to prevent reverse current flow between the negative terminal and the load (e.g. reverse current flow from the negative terminal to the load).

The circuit may comprise a high-side reverse current limiter circuit connected between the positive terminal and the load to prevent reverse current flow between the positive terminal and the load (e.g. reverse current flow from the load to the positive terminal).

The low-side reverse current limiter circuit may comprise: a MOSFET having a drain electrically connected to the negative terminal, a source electrically connected to the load, and a gate electrically connected to an output of a gate driver circuit; a first offset voltage source circuit having a positive node, a negative node electrically connected to the MOSFET source and providing a first offset voltage Voffset1; a second offset voltage source circuit having a positive node, a negative node electrically connected to the MOSFET drain and providing a second offset voltage Voffset2; a first diode having a cathode electrically connected to the positive node of the second offset voltage source circuit; and a bipolar transistor having an emitter electrically connected to the positive node of the first offset voltage source circuit, a base electrically connected to the anode of the first diode, and a collector electrically connected to an input of the gate driver circuit. The low-side reverse current limiter circuit may be configured to regulate or prevent current flow from the negative terminal to the load.

The low-side reverse current limiter circuit my comprise: a MOSFET having a drain electrically connected to the second solid state switch, a source electrically connected to the negative terminal and a gate electrically connected to an output of a gate driver circuit; a first offset voltage source circuit having a positive node, a negative node electrically connected to the MOSFET source and providing a first offset voltage Voffset1; a second offset voltage source circuit having a positive node, a negative node electrically connected to the MOSFET drain and providing a second offset voltage Voffset2; a first diode having a cathode electrically connected to the positive node of the second offset voltage source circuit; and a bipolar transistor having an emitter electrically connected to the positive node of the first offset voltage source circuit, a base electrically connected to the anode of the first diode, and a collector electrically connected to an input of the gate driver circuit. The low-side reverse current limiter circuit may be configured to regulate or prevent current flow from the second solid state switch to the negative terminal.

The high-side reverse current limiter circuit may comprise: a MOSFET having a drain electrically connected to the load, a source electrically connected to the positive terminal, and a gate electrically connected to an output of a gate driver circuit; a first offset voltage source circuit having a positive node, a negative node electrically connected to the MOSFET source and providing a first offset voltage Voffset1; a second offset voltage source circuit having a positive node, a negative node electrically connected to the MOSFET drain and providing a second offset voltage Voffset2; a first diode having a cathode electrically connected to the positive node of the second offset voltage source circuit; and a bipolar transistor having an emitter electrically connected to the positive node of the first offset voltage source circuit, a base electrically connected to the anode of the first diode, and a collector electrically connected to an input of the gate driver circuit. The high-side reverse current limiter circuit may be configured to regulate or prevent current flow from the load to the positive terminal.

The high-side reverse current limiter circuit may comprise: a MOSFET having a drain electrically connected to the positive terminal, a source electrically connected to the first solid state switch, and a gate electrically connected to an output of a gate driver circuit; a first offset voltage source circuit having a positive node, a negative node electrically connected to the MOSFET source and providing a first offset voltage Voffset1; a second offset voltage source circuit having a positive node, a negative node electrically connected to the MOSFET drain and providing a second offset voltage Voffset2; a first diode having a cathode electrically connected to the positive node of the second offset voltage source circuit; and a bipolar transistor having an emitter electrically connected to the positive node of the first offset voltage source circuit, a base electrically connected to the anode of the first diode, and a collector electrically connected to an input of the gate driver circuit. The high-side reverse current limiter circuit may be configured to regulate or prevent current flow from the positive terminal to the first solid state switch.

Regulation of the reverse current may be based at least in part on the first and second offset voltages Voffset1 and Voffset2. The MOSFET may have an equivalent impedance Rdson and equivalent voltage Vdson between its drain and source when the MOSFET is in a conducting state. At least one of the first and second offset voltages Voffset1 and Voffset2 I may be configurable based at least in part on selection of one or more resistance values in at least one of the first and second offset voltage source circuits.

The first connection from the first photovoltaic cell to the load and the second connection from the second photovoltaic cell to the load may be effected by a releasably connectable cable. The switch-control input signal may be provided to the first and second switch-control isolation blocks in response to (e.g. only after) the releasably connectable cable is physically connected to or physically disconnected from the load.

Physical disconnection of the releasably connectable cable from the load may disrupt the switch-control input signal, thereby causing the first and second switch-control isolation blocks to cause the first and second isolated switch-control signals to turn the first and second solid state switches to their OFF (non-conducting) states.

The switch-control input signal may be received at the first and second switch-control isolation blocks via the releasably connectable cable. The switch-control input signal may be received at the first and second switch-control isolation blocks from the load.

A detected presence of a person within an unsafe space may disrupt the switch-control input signal, thereby causing the first and second switch-control isolation blocks to cause the first and second isolated switch-control signals to turn the first and second solid state switches to their OFF (non-conducting) states.

Detection of a problematic state by a switch, camera or sensor may disrupt the switch-control input signal, thereby causing the first and second switch-control isolation blocks to cause the first and second isolated switch-control signals to turn the first and second solid state switches to their OFF (non-conducting) states.

Another aspect of the invention comprises a portable solar charging system comprising a plurality of photovoltaic array circuits as described herein connected in parallel between the positive terminal and the negative terminal.

Another aspect of the invention provides an electrical transmission safety system for connection of direct current (DC) power from a DC power source to a load. The system comprises: a connection from the power source to the load, the connection comprising a positive terminal and a negative terminal; a first solid state switch electrically connected between the power source and one of the positive terminal and negative terminal; and a switch-control isolation block for generating a first isolated switch-control signal in response to a switch-control input signal, the switch-control isolation block connected to provide the first isolated switch-control signal to the first solid state switch to thereby control an ON or OFF conduction state of the first solid state switch and corresponding current flow between the power source and the load through the one of the positive terminal and negative terminal; wherein the switch-control isolation block receives the switch-control input signal from the load.

The system may comprise a second solid state switch electrically connected between the power source and the other one of the positive terminal and negative terminal.

The switch-control isolation block may be configured to generate a second isolated switch-control signal in response to the switch-control input signal and connected to provide the second isolated switch-control signal to the second solid state switch to thereby control an ON or OFF conduction state of the second solid state switch and corresponding current flow between the power source and the load through the other one of the positive terminal and negative terminal.

The connection between the power source and the load may be effected by a releasably connectable cable. The switch-control input signal may be provided to the switch-control isolation block in response to the releasably connectable cable being physically connected to or physically disconnected from the load.

Physical disconnection of the releasably connectable cable from the load may disrupt the switch-control input signal, thereby causing the switch-control isolation block to cause the first isolated switch-control signal to turn the first solid state switch to an OFF (non-conducting) state.

The switch-control input signal may be received at the switch-control isolation block via the releasably connectable cable.

A detected presence of a person within an unsafe space may disrupt the switch-control input signal, thereby causing the switch-control isolation block to cause the first isolated switch-control signal to turn the first solid state switch to an OFF (non-conducting) state.

Detection of a problematic state by a switch, camera or sensor my disrupt the switch-control input signal, thereby causing the switch-control isolation block to cause the first isolated switch-control signal to turn the first solid state switch to an OFF (non-conducting) state.

Another aspect of the invention provides a photovoltaic array circuit comprising: a first electrical transmission safety system for connection of a first photovoltaic cell to a load, the first electrical transmission safety system comprising: a first connection from the first photovoltaic cell to the load, the first connection comprising a positive terminal; a first solid state switch electrically connected between the first photovoltaic cell and the positive terminal; and a first switch-control isolation block for generating a first isolated switch-control signal in response to a switch-control input signal, the first switch-control isolation block connected to provide the first isolated switch-control signal to the first solid state switch to thereby control an ON or OFF conduction state of the first solid state switch and corresponding current flow between the first photovoltaic cell and the load through the positive terminal; a second electrical transmission safety system for connection of a second photovoltaic cell to the load, the second electrical transmission safety system comprising: a second connection from the second photovoltaic cell to the load, the second connection comprising a negative terminal; a second solid state switch electrically connected between the second photovoltaic cell and the negative terminal; and a second switch-control isolation block for generating a second isolated switch-control signal in response to the switch-control input signal, the second switch-control isolation block connected to provide the second isolated switch-control signal to the second solid state switch to thereby control an ON or OFF conduction state of the second solid state switch and corresponding current flow between the second photovoltaic cell and the load through the negative terminal. The first photovoltaic cell is connected to output a first DC potential between a first positive node connected to the first solid state switch on a side of the first solid state switch opposite the positive terminal and a first negative node. The second photovoltaic cell is connected to output a second DC potential between a second negative node connected to the second solid state switch on a side of the second solid state switch opposite the negative terminal and a second positive node. The first negative node is electrically connected to the second positive node. The first and second switch-control isolation blocks receive the switch-control input signal from the load.

The circuit may comprise a low-side reverse current limiter circuit connected between the second solid state switch and the negative terminal to prevent reverse current flow between the second solid state switch and the negative terminal (e.g. reverse current flow from the second solid state switch to the negative terminal).

The circuit may comprise a high-side reverse current limiter circuit connected between the first solid state switch and the positive terminal to prevent reverse current flow between the first solid state switch and the positive terminal (e.g. reverse current flow from the positive terminal to the first solid state switch).

The circuit may comprise a low-side reverse current limiter circuit connected between the negative terminal and the load to prevent reverse current flow between the negative terminal and the load (e.g. reverse current flow from the negative terminal to the load).

The circuit may comprise a high-side reverse current limiter circuit connected between the positive terminal and the load to prevent reverse current flow between the positive terminal and the load (e.g. reverse current flow from the load to the positive terminal).

The low-side reverse current limiter circuit may comprise: a MOSFET having a drain electrically connected to the negative terminal, a source electrically connected to the load, and a gate electrically connected to an output of a gate driver circuit; a first offset voltage source circuit having a positive node, a negative node electrically connected to the MOSFET source and providing a first offset voltage Voffset1; a second offset voltage source circuit having a positive node, a negative node electrically connected to the MOSFET drain and providing a second offset voltage Voffset2; a first diode having a cathode electrically connected to the positive node of the second offset voltage source circuit; and a bipolar transistor having an emitter electrically connected to the positive node of the first offset voltage source circuit, a base electrically connected to the anode of the first diode, and a collector electrically connected to an input of the gate driver circuit. The low-side reverse current limiter circuit may be configured to regulate or prevent current flow from the negative terminal to the load.

The low-side reverse current limiter circuit my comprise: a MOSFET having a drain electrically connected to the second solid state switch, a source electrically connected to the negative terminal and a gate electrically connected to an output of a gate driver circuit; a first offset voltage source circuit having a positive node, a negative node electrically connected to the MOSFET source and providing a first offset voltage Voffset1; a second offset voltage source circuit having a positive node, a negative node electrically connected to the MOSFET drain and providing a second offset voltage Voffset2; a first diode having a cathode electrically connected to the positive node of the second offset voltage source circuit; and a bipolar transistor having an emitter electrically connected to the positive node of the first offset voltage source circuit, a base electrically connected to the anode of the first diode, and a collector electrically connected to an input of the gate driver circuit. The low-side reverse current limiter circuit may be configured to regulate or prevent current flow from the second solid state switch to the negative terminal.

The high-side reverse current limiter circuit may comprise: a MOSFET having a drain electrically connected to the load, a source electrically connected to the positive terminal, and a gate electrically connected to an output of a gate driver circuit; a first offset voltage source circuit having a positive node, a negative node electrically connected to the MOSFET source and providing a first offset voltage Voffset1; a second offset voltage source circuit having a positive node, a negative node electrically connected to the MOSFET drain and providing a second offset voltage Voffset2; a first diode having a cathode electrically connected to the positive node of the second offset voltage source circuit; and a bipolar transistor having an emitter electrically connected to the positive node of the first offset voltage source circuit, a base electrically connected to the anode of the first diode, and a collector electrically connected to an input of the gate driver circuit. The high-side reverse current limiter circuit may be configured to regulate or prevent current flow from the load to the positive terminal.

The high-side reverse current limiter circuit may comprise: a MOSFET having a drain electrically connected to the positive terminal, a source electrically connected to the first solid state switch, and a gate electrically connected to an output of a gate driver circuit; a first offset voltage source circuit having a positive node, a negative node electrically connected to the MOSFET source and providing a first offset voltage Voffset1; a second offset voltage source circuit having a positive node, a negative node electrically connected to the MOSFET drain and providing a second offset voltage Voffset2; a first diode having a cathode electrically connected to the positive node of the second offset voltage source circuit; and a bipolar transistor having an emitter electrically connected to the positive node of the first offset voltage source circuit, a base electrically connected to the anode of the first diode, and a collector electrically connected to an input of the gate driver circuit. The high-side reverse current limiter circuit may be configured to regulate or prevent current flow from the positive terminal to the first solid state switch.

The first connection from the first photovoltaic cell to the load and the second connection from the second photovoltaic cell to the load may be effected by a releasably connectable cable. The switch-control input signal may be provided to the first and second switch-control isolation blocks in response to (e.g. only after) the releasably connectable cable is physically connected to or physically disconnected from the load.

Physical disconnection of the releasably connectable cable from the load may disrupt the switch-control input signal, thereby causing the first and second switch-control isolation blocks to cause the first and second isolated switch-control signals to turn the first and second solid state switches to their OFF (non-conducting) states.

The switch-control input signal may be received at the first and second switch-control isolation blocks via the releasably connectable cable.

A detected presence of a person within an unsafe space may disrupt the switch-control input signal, thereby causing the first and second switch-control isolation blocks to cause the first and second isolated switch-control signals to turn the first and second solid state switches to their OFF (non-conducting) states.

Selection of a problematic state by a switch, camera or sensor may disrupt the switch-control input signal, thereby causing the first and second switch-control isolation blocks to cause the first and second isolated switch-control signals to turn the first and second solid state switches to their OFF (non-conducting) states.

Another aspect of the invention comprises a portable solar charging system comprising a plurality of photovoltaic array circuits as described herein connected in parallel between the positive terminal and the negative terminal.

Another aspect of the invention provides, and any of the reverse current limiter circuits described herein may comprise, a reverse current limiting apparatus for regulating current flow between an input terminal and an output terminal, the apparatus comprising: a MOSFET having a drain terminal electrically connected to the output terminal, a source terminal electrically connected to the input terminal, and a gate terminal electrically connected to an output of a gate driver circuit; an offset impedance having a positive terminal, a negative terminal electrically connected to the drain of the MOSFET, and a first voltage from the negative terminal to the positive terminal; an offset voltage source having a positive terminal, a negative terminal electrically connected to the source of the MOSFET, and a second voltage from the negative terminal to the positive terminal; a first diode having a cathode electrically connected to the positive terminal of the first offset voltage source; and a bipolar transistor having an emitter electrically connected to the positive terminal of the second offset voltage source, a base electrically connected to the anode of the first diode, and a collector electrically connected to an input of the gate driver circuit. The apparatus may be configured to regulate current flow from the output terminal to the input terminal based at least in part on a voltage between the positive terminal of the offset impedance and the positive terminal of the offset voltage source.

The reverse current limiting apparatus may comprise a first impedance electrically connected between the gate of the MOSFET and the output of the gate driver circuit.

The reverse current limiting apparatus may comprise: a second impedance electrically connected between the emitter of the bipolar transistor and the input terminal; and a third impedance electrically connected between the emitter of the bipolar transistor and positive terminal of the offset voltage source. A resistance of the third impedance may be greater than a resistance of the second impedance.

The reverse current limiting apparatus may comprise a fourth impedance electrically connected between the base of the bipolar transistor and the positive terminal of the offset voltage source.

The reverse current limiting apparatus may comprise: a second diode having a cathode electrically connected to the positive terminal of the offset impedance; and a fifth impedance electrically connected between the cathode of the second diode and the positive terminal of the offset voltage source. A resistance of the fifth impedance may be less than the resistance of the fourth impedance.

The gate drive circuit of the reverse current limiting apparatus may comprise: an NPN bipolar transistor having a base electrically connected to the input of the gate driver circuit, a collector electrically connected to the input terminal, and an emitter electrically connected to the output of the gate driver circuit; a PNP bipolar transistor having a base electrically connected to the input of the gate driver circuit, a collector electrically connected to the positive terminal of the offset voltage source, and an emitter electrically connected to the output of the gate driver circuit; and a sixth impedance electrically connected between the input of the gate driver circuit and the positive terminal of the offset voltage source.

The reverse current limiting apparatus may comprise a capacitor electrically connected between the positive terminal of the offset voltage and the input terminal.

The current flow between the MOSFET drain and the MOSFET source may depend at least in part on the resistance of one or more of the first, second, third, fourth, fifth and sixth impedances.

The offset impedance may comprise a bipolar transistor having a base voltage, and the base voltage depends at least in part on an external control voltage.

The external control voltage may comprise a voltage from an external sensor. The external sensor may comprise a Hall effect sensor or other sensor measuring the input or output current of the circuit.

Another aspect of the invention provides, and any of the reverse current limiter circuits described herein may function to provide a method for limiting a current flow between two terminals. The comprises: selecting a first offset voltage source and a second offset voltage source; connecting a negative side of the first offset voltage source to a drain of a MOSFET; connecting a negative side of the second offset voltage source to a source of the MOSFET; connecting the drain of the MOSFET to a first one of the terminals; connecting the source of the MOSFET to a second one of the terminals; connecting a cathode of a first diode to a positive side of the first offset voltage source; connecting a cathode of a second diode to a positive side of the second offset voltage source; and connecting together the anodes of the first diode and the second diode.

The first offset voltage source and the second offset voltage source may be selected to allow no more than a threshold amount of current to flow from the first one of the terminals to the second one of the terminals.

The first offset voltage source and the second offset voltage source may be selected to allow between a first threshold amount of current and a second threshold amount of current to flow from the first one of the terminals to the second one of the terminals.

The first offset voltage source may be dynamically configurable to allow a varying amount of current to flow from the first one of the terminals to the second one of the terminals in response to a control signal applied to the first offset voltage source.

The second offset voltage source may be dynamically configurable to allow a varying amount of current to flow from the first one of the terminals to the second one of the terminals in response to a control signal applied to the first offset voltage source.

Another aspect of the invention provides a method for connecting a photovoltaic array to and disconnecting a photovoltaic array from a load. The comprises: connecting a first photovoltaic cell to a positive terminal of the load via a first electrical transmission safety system, the first electrical transmission safety system comprising: a first solid state switch electrically connected between the first photovoltaic cell and the positive terminal; and a first switch-control isolation block comprising a first optocoupler, the first optocoupler providing electrical isolation from the first photovoltaic cell for generating a first isolated switch-control signal in response to a switch-control input signal, the first switch-control isolation block connected to provide the first isolated switch-control signal to the first solid state switch to thereby control an ON or OFF conduction state of the first solid state switch and corresponding current flow between the first photovoltaic cell and the load through the positive terminal; connecting a second photovoltaic cell to a negative terminal of the load via a second electrical transmission safety system, the second electrical transmission safety system comprising: a second solid state switch electrically connected between the second photovoltaic cell and the negative terminal; and a second switch-control isolation block comprising a second optocoupler, the second optocoupler providing electrical isolation from the second photovoltaic cell for generating a second isolated switch-control signal in response to the switch-control input signal, the second switch-control isolation block connected to provide the second isolated switch-control signal to the second solid state switch to thereby control an ON or OFF conduction state of the second solid state switch and corresponding current flow between the second photovoltaic cell and the load through the negative terminal; connecting the first photovoltaic cell to output a first DC potential between a first positive node connected to the first solid state switch on a side of the first solid state switch opposite the positive terminal and a first negative node; connecting the second photovoltaic cell to output a second DC potential between a second negative node connected to the second solid state switch on a side of the second solid state switch opposite the negative terminal and a second positive node; and electrically connecting the first negative node to the second positive node.

The method may comprise method steps corresponding to any of the features described and/or recited herein.

Other aspect of the invention provide apparatus comprising any features, combinations of features and/or sub-combinations of features disclosed herein.

Other aspects of the invention provide methods comprising any features, combinations of features and/or sub-combinations of features disclosed herein.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
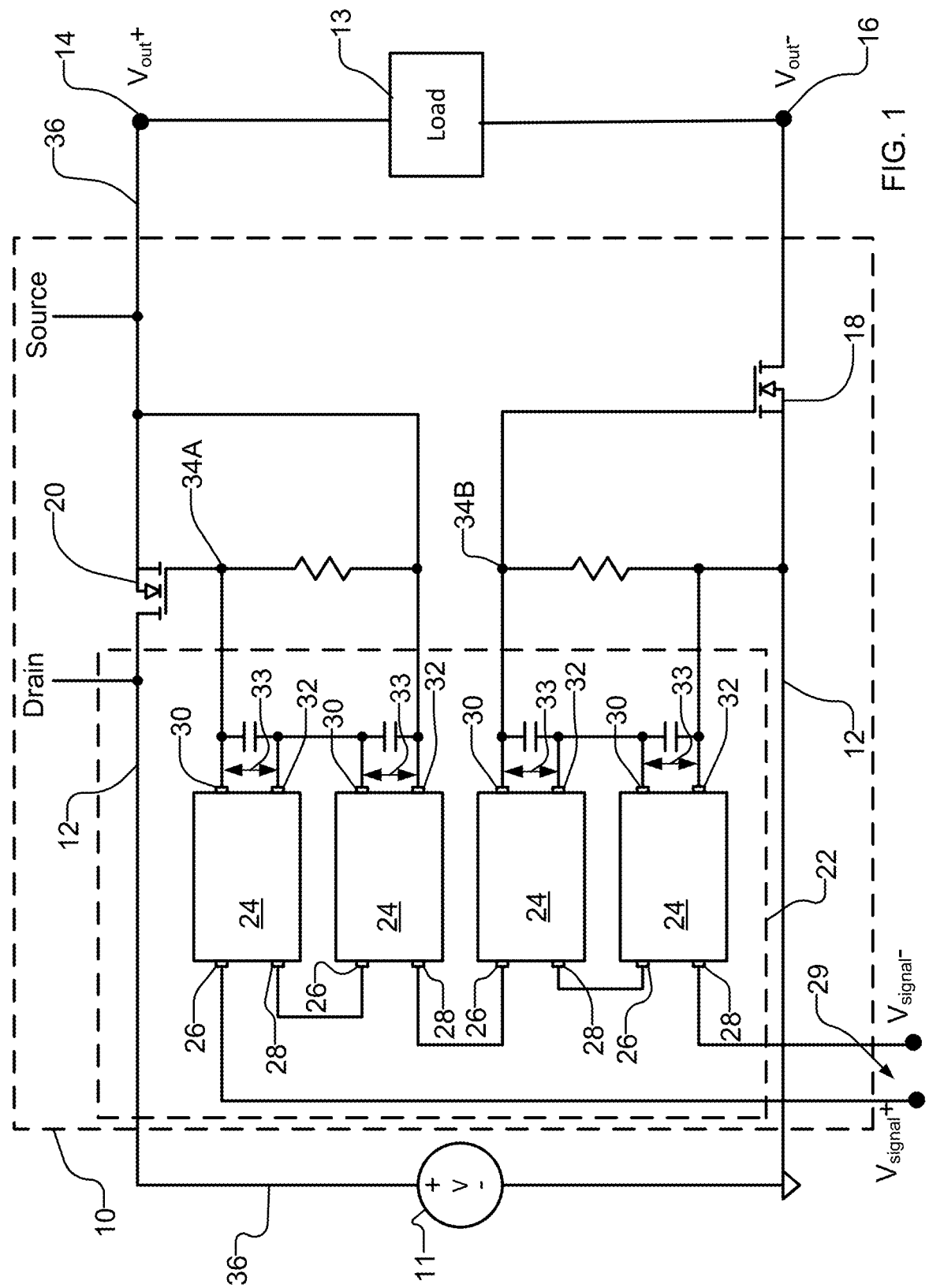
FIG. 1 illustrates a circuit diagram of an electrical transmission safety system connected to a solar panel according to an example embodiment.

Referring to FIG. 1, an electrical transmission safety system 10 according to an example embodiment is provided for connecting and disconnecting one or more photovoltaic panels (schematically represented by DC power source 11)

to a load 13, where load 13 may be physically and electrically connectable and disconnectable between ports (or terminals) 14, 16. Electrical transmission safety system 10 controls a direct current (DC) power connection from DC power source 11 to load 13. Electrical transmission safety system 10 (or, for brevity, system 10) comprises a circuit connection line 12 which provides an electrical path between a positive terminal 14 and a negative terminal 16. As mentioned above, load 13 may be physically and electrically connectable and disconnectable between terminals 14, 16. One or more solid state switches 18, 20 are electrically connected between power source 11 and either or both of positive terminal 14 and negative terminal 16. One or more switch-control isolation blocks 22 which receive one or more input switch control signal(s) 29 and generate one or more corresponding isolated switch control signals 34A, 34B to operate the one or more solid state switches 18, 20. In some embodiments, a single switch-control isolation block 22 can govern multiple solid state switches, as illustrated in FIG. 1 where a single switch-control isolation block 22 outputs switch control signal(s) (e.g. at nodes 34A, 34B) and the switch control signals 34A, 234B govern two solid state switches 18, 20. In various embodiments, each switch-control isolation block 22 governs either a single corresponding solid state switch or a plurality (e.g. a pair) of solid state switches. In some embodiments, a single switch-control isolation block 22 might govern three or more solid state switches (not shown).

In various embodiments, switch-control isolation blocks 22 generate switch control signals 34A, 34B that operate corresponding solid state switches 18, 20 to be in either an ON (conducting) or OFF (non-conducting) state. In an ON (conducting) state, solid state switches 18, 20 maintain an electrical connection between power source 11 and load 13. In an OFF (non-conducting) state, solid state switches 18, 20 are open (non-conducting) and prevent electrical conduction between power source 11 and nodes 14, 16 and, consequently, prevent electrical connection (e.g. current flow) to load 13. In both the ON (conducting) state and the OFF (non-conducting) state of solid state switches 18, 20, load 13 may be physically connected to one or both of terminals 14, 16. That is, the physical connection of load 13 to either or both of terminals 14, 16 may be independent of the ON or OFF state of solid state switches 18, 20. In various embodiments, switches 18, 20 are effected by solid state switches which do not include electromechanical components or mechanical components, such as electromagnetic relays. Advantageously, solid state switches suffer less performance degradation with multiple switching cycles (when compared to electromechanical or mechanical switches) and, consequently, are relatively more suitable for portable power applications (where there is a desire to frequently connect and disconnect power to from power sources (e.g. source 11) to loads (e.g. load 13) at various locations). Further, solid state switches are relatively less prone to electrical discharge (arcs or sparking) and environmental deterioration (such as corrosion or oxidation due to condensing humidity experienced in outdoor and portable settings) than their electromechanical and mechanical counterparts.

Figure 2:
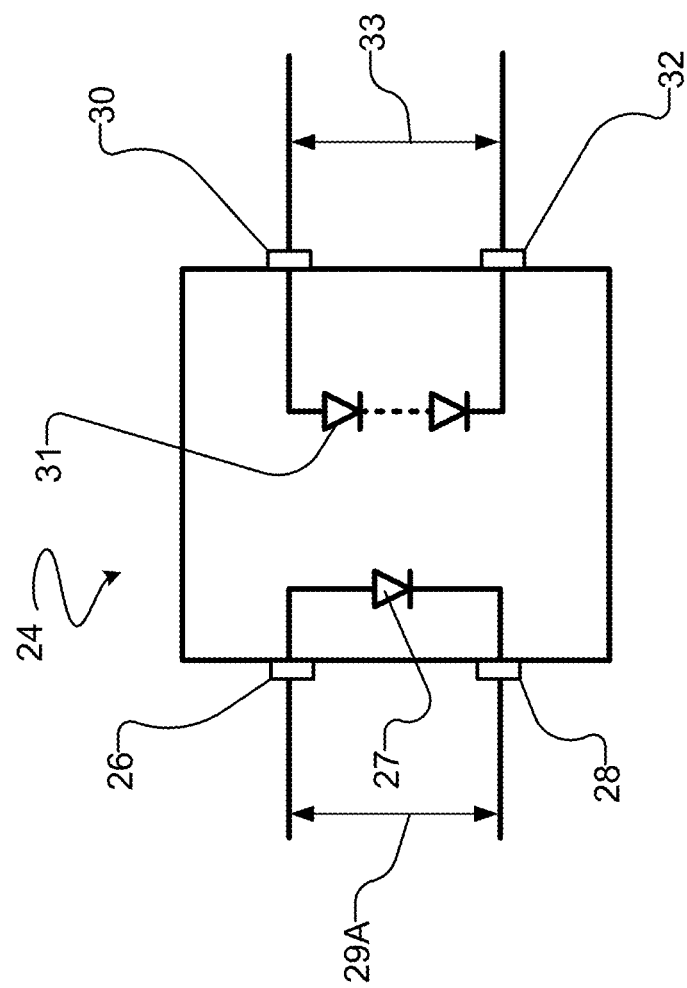
FIG. 2 illustrates a circuit diagram of an optocoupler as might be used in an electrical transmission safety system such as the FIG. 1 electrical transmission safety system.

Switch-control isolation blocks 22 may comprise an optocoupler 24 (also known as a photocoupler, opto-isolator or optical isolator), which may be used to provide electrical isolation between output signals 34A, 34B of switch-control isolation blocks 22 and power source 11 and its power circuit 36. In some embodiments, optocoupler 24 comprises a photovoltaic-output optocoupler with an anode input 26, cathode input 28, anode output 30 and cathode output 32, as illustrated in FIGS. 1 and 2. Solid state switches 18, 20 may each comprise a MOSFET transistor. In some such embodiments, a switch control signal may then be provided in the form of a signal voltage across (or signal current between) anode input 26 and cathode input 28, which generates corresponding electrically isolated control signal(s) (e.g. at nodes 34A, 34B) on the output end of the optocoupler 24. The electrically isolated control signal(s) may then control the operation of solid state switches 18 and/or 20.

In some embodiments, electrical transmission safety system 10 comprises a circuit, or a set of circuits (e.g. switch-control isolation block(s) 22) each comprising one or more optocouplers 24, driving one or more solid state switches 18, 20, which may comprise MOSFETs or similar semiconductor devices capable of high speed switching. Each such circuit may be connectable to one or more photovoltaic panel outputs (e.g. voltage source 11) respectively. The switching of system 10 can be controlled from external signal sources providing signal voltages or signal currents (e.g. input signal voltage 29) to the inputs of optcouplers 24. Such external signal sources may, for example, use a detector to detect the proximity of a human being or to otherwise ascertain some other reason to disconnect the PV panels, and produce such signal voltages or signal currents. When such signal voltages or signal currents are provided to the inputs of optocouplers 24, optocouplers 24 output corresponding electrically isolated signals (e.g. signals 34A, 34B) that cause the switching of solid state switches 18, 20 to electrically disconnect said photovoltaic panels from load 13 to prevent electrical hazards.

FIG. 1, is a schematic diagram with just one PV panel schematically represented by voltages source 11 (although voltage source 11 may be considered to comprise a plurality of series connected photovoltaic cells). An input signal 29 (represented by signal terminals Vsignal+ and Vsignal−) is applied to the input side of a stack of optocouplers 24 connected in series, to provide electrically isolated signals 34A, 34B which operate (turn ON and/or OFF) MOSFETs 18, 20. Optocouplers 24 may be used to provide complete electrical isolation of the MOSFET control signals 34A, 34B from the high voltages across Vout+ and Vout− in power circuit 36 resulting from the series-connected PV panels, as well as providing high speed response to the input signal voltage 29. The output signal voltages 33 generated across electrically isolated anode and cathode outputs 30, 32 of the series of optocouplers 24 result in electrically isolated signals 34A, 34B which are present at the gate(s) of switches (e.g. MOSFETs) 18, 20. When the input signal voltage 29 between terminals (Vsignal+, Vsignal-) is high, the voltages across anode inputs 26 and cathode inputs 28 of optocouplers 24 result in electrically isolated signals 34A, 34B which turn switches (e.g. MOSFETS) 18, 20 into ON (conducting) states, thereby electrically connecting voltage source 11 (PV panels) to load 13. In contrast, when the input signal voltage 29 between terminals (Vsignal+, Vsignal−) is low, optocouplers 24 generate electrically isolated signals 34A, 34B which turn switches (e.g. MOSFETS) 18, 20 into OFF (non-conducting) states, thereby electrically disconnecting voltage source 11 (PV panels) from load 13.

FIG. 1 shows a circuit diagram for signal-driven connection and disconnection of a single PV panel, for both positive and negative output lines. In the specific case of FIG. 1, the circuit as shown can accept an input signal (e.g. a 12V input signal) 29 across Vsignal+ and Vsignal− applied to optocouplers 24 to generate electrically isolated control signals 34A, 34B to control the output MOSFETS 18, 20, but the circuit can readily be modified or augmented to use other signal voltages.

In FIG. 2, a simplified photovoltaic-output optocoupler 24 is illustrated to clearly show the operation of the diodes and the electrical isolation of the input circuit (i.e. illustrated at anode input 26 and cathode input 28) of optocoupler 24 relative to the output circuit (i.e. illustrated at anode output 30 and cathode output 32) of optocoupler 24 in accordance with a specific embodiment. Specifically, an input signal 29 (FIG. 1) results in a voltage 29A between input nodes 26, 28 and causes one or more light emitting diodes (LEDs) 27 to emit radiation, which is detected by one or more photo-detecting diodes (or other suitable photo-detectors) 31 which, in turn, generate an electrically connected output signal 33 between output nodes 30, 32.

Figure 3:
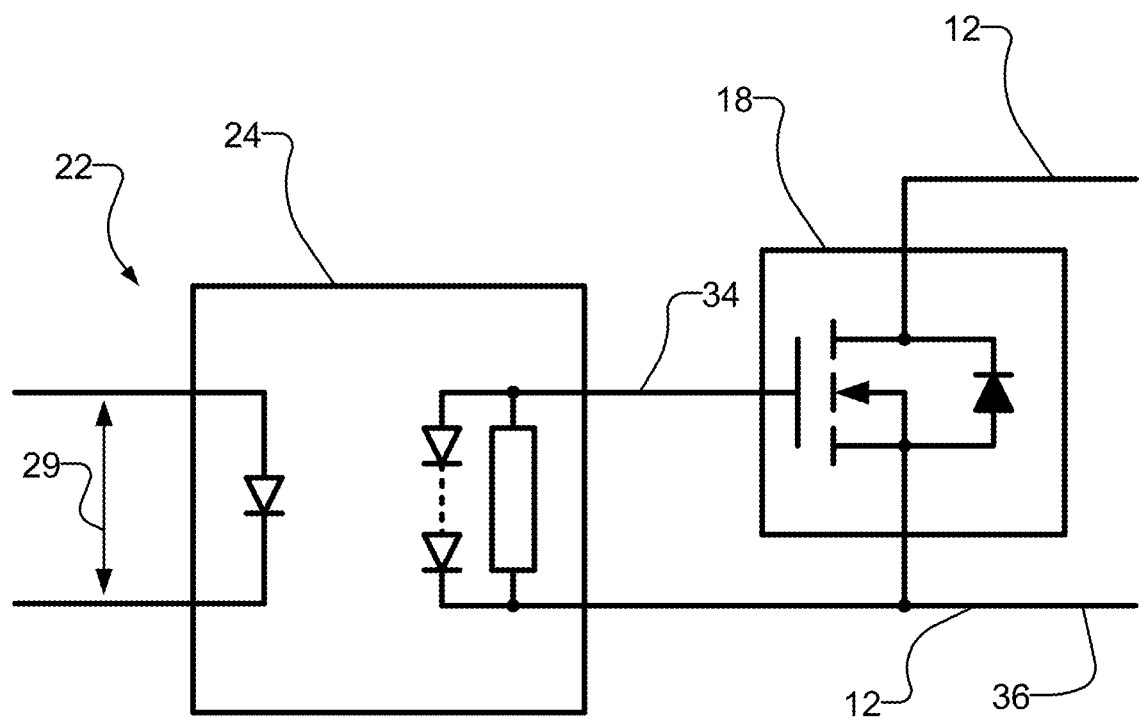
FIG. 3 illustrates a circuit diagram of an optocoupler connected to a solid state switch as might be used in an electrical transmission safety system such as the FIG. 1 electrical transmission safety system.

FIG. 3 shows a simplified illustration of how an optocoupler 24 and a MOSFET (solid state switch 18, 20) may operate in combination to control the conduction electricity within a connection line 12 while providing optical isolation between the output 34 of switch-control isolation block 22 and main power circuit 36 (see FIG. 1) of electrical transmission safety system 10.

Potential signal sources or detectors to drive input signal 29 between terminals ($V_{signal+}$, $V_{signal-}$) use with system 10 may include, but are not limited to: interlock switches on entrance doors or panels; motion, sound, or vibration sensors; camera(s) or other optical sensor(s) with suitable image and/or signal processing to detect human presence or other conditions of concern; optical, RF, and/or acoustic transmitter and detector pairs for which disruption of a transmitted beam represents a potential hazardous presence; capacitance sensors and other touch and/or pressure and/or proximity sensors and/or the like. In addition, amplified parasitic current detection may be utilized to detect a fault such as an undesirable current to ground, a current to a chassis or case or some other undesired current that can then be utilized to generate input signal 29 or used to trigger the generation of input signal 29. In the case that an undesired current is utilized to generate input signal 29, the undesired current— e.g. a current to ground or to any undesired local connection—can be detected by resistive, electromagnetic, Hall Effect, or other suitably configured sensors, with the detected current then amplified as required to produce an appropriate change in the input signal 29. This approach may be similar to the use of a ground fault interrupter to prevent electric shock in some residential electrical installations. Manual switching by interruption of the input signal 29 between terminals ($V_{signal+}$, $V_{signal-}$) can also be readily performed.

Figure 4:
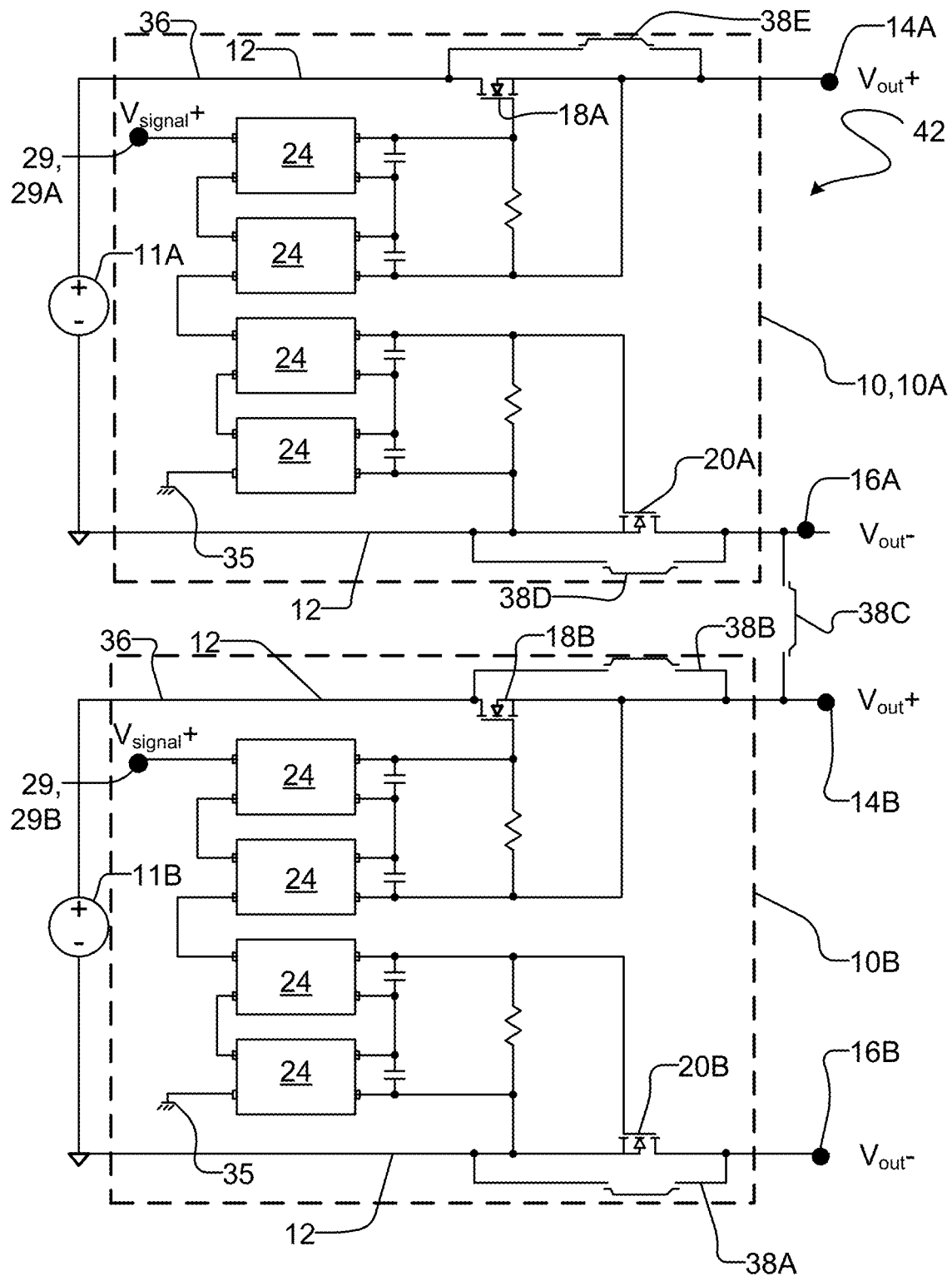
FIG. 4 illustrates a circuit diagram of a solar combiner which connects, in series, the outputs of two solar panels incorporating FIG. 1 electrical transmission safety systems.

FIG. 4 illustrates a practical example of a solar combiner 42 utilizing electrical transmission safety system 10 with multiple series-connected PV panels (each schematically represented by a corresponding voltage sources 11A, 11B) according to a particular embodiment. In this system, an electrical control input signal 29 is utilized to electrically connect multiple PV panels 11A, 11B, which may be connected in series, to a load 13 (not expressly shown in FIG. 4) which may be physically connectable between terminals 14A, 16B. In FIG. 4, the electrical control input signal 29 is generated as a voltage between the terminal $V_{signal+}$ and a ground 35. This system is an extension of the FIG. 1 circuit for use with arrays of PV panels 11A, 11B to arrange them to be connectable in series or in parallel. Connection of the PV panels in a series configuration may provide for higher voltage outputs (e.g. between power output nodes 14A, 16B), but may increase some electrical hazards. Use of electrical transmission safety system 10 allows for safety in the control of the series-connected solar panels 11A, 11B (in the case of the illustrated FIG. 4 embodiment) or parallel-connected solar panels. Use of the electrical transmission safety system 10 may also allow for safe disconnection of any or all PV panels 11A, 11B using any of the individually isolated solid state switches 18A, 20A, 18B, 20B not otherwise bypassed by one of the jumpers 38.

In FIG. 4, two solar panels or two groups (each group a plurality) of solar panels (schematically represented by voltage sources 11A, 11B) are illustrated which are connectable in series by the application of selected jumpers 38. When all jumpers 38 are not connected (leaving open circuits between their corresponding nodes), the two panels 11A, 11B are arranged to work in parallel, with each panel having a corresponding electrical transmission safety system 10A, 10B having the configuration of the FIG. 1 system 10 and each panel 11A, 11B connectable to a corresponding load (not shown in FIG. 4) between its terminals 14A, 16A and 14B, 16B. By connecting jumpers 38B, 38C and 38D to close the bypass circuits at those locations, the voltage Vout+ of panel 11B (at terminal 14B) is connected to the voltage Vout- of panel 11A (at terminal 16A). That is, terminals 14B, 16A are electrically connected to provide a single electrical node. This connection of the negative terminal (e.g. negative terminal 16A) of one photovoltaic cell (e.g. photovoltaic cell 11A) and its corresponding electrical transmission safety system (e.g. system 10A) to the positive terminal (e.g. positive terminal 14B) of another photovoltaic cell (e.g. photovoltaic cell 11B) and its corresponding electrical transmission safety system (e.g. system 10B) can be repeated iteratively. For example, a further solar panel could be connected in series to solar panel 11B and its electrical transmission safety system 10B by connected the positive terminal of the further solar panel and its corresponding electrical transmission safety system to the negative terminal 16B of solar panel 11B and its corresponding electrical transmission safety system 10B using a similar arrangement of jumpers 38 to jumpers 38B, 38C, 38D between solar panels 11A, 11B and electrical transmission safety systems 10A, 10B. It will be appreciated that the use of jumpers 38 is for flexibility to arrange the FIG. 4 solar combiner 42 in a variety of parallel and/or series configurations and to permit the addition of additional solar panels and corresponding electrical transmission safety systems 10A, 10B. This is not necessary. In some embodiments, one or more of jumpers 38 may be replaced with short circuits and/or open circuits as desired and the components (e.g. solid state switched) bypassed by short circuits may be omitted In the FIG. 4 embodiment, electrical transmission safety systems 10A, 10B associated with corresponding solar panels 11A, 11B are both controlled by the same electrical control input signal 29 ($V_{signal+}$). In some embodiments, independent control input signals 29A, 29B ($V_{signal+A}$, $V_{signal+B}$) may be provided for independently controlling electrical safety systems 10A, 10B corresponding to each PV panel 11A, 11B in an array.

Figure 5:
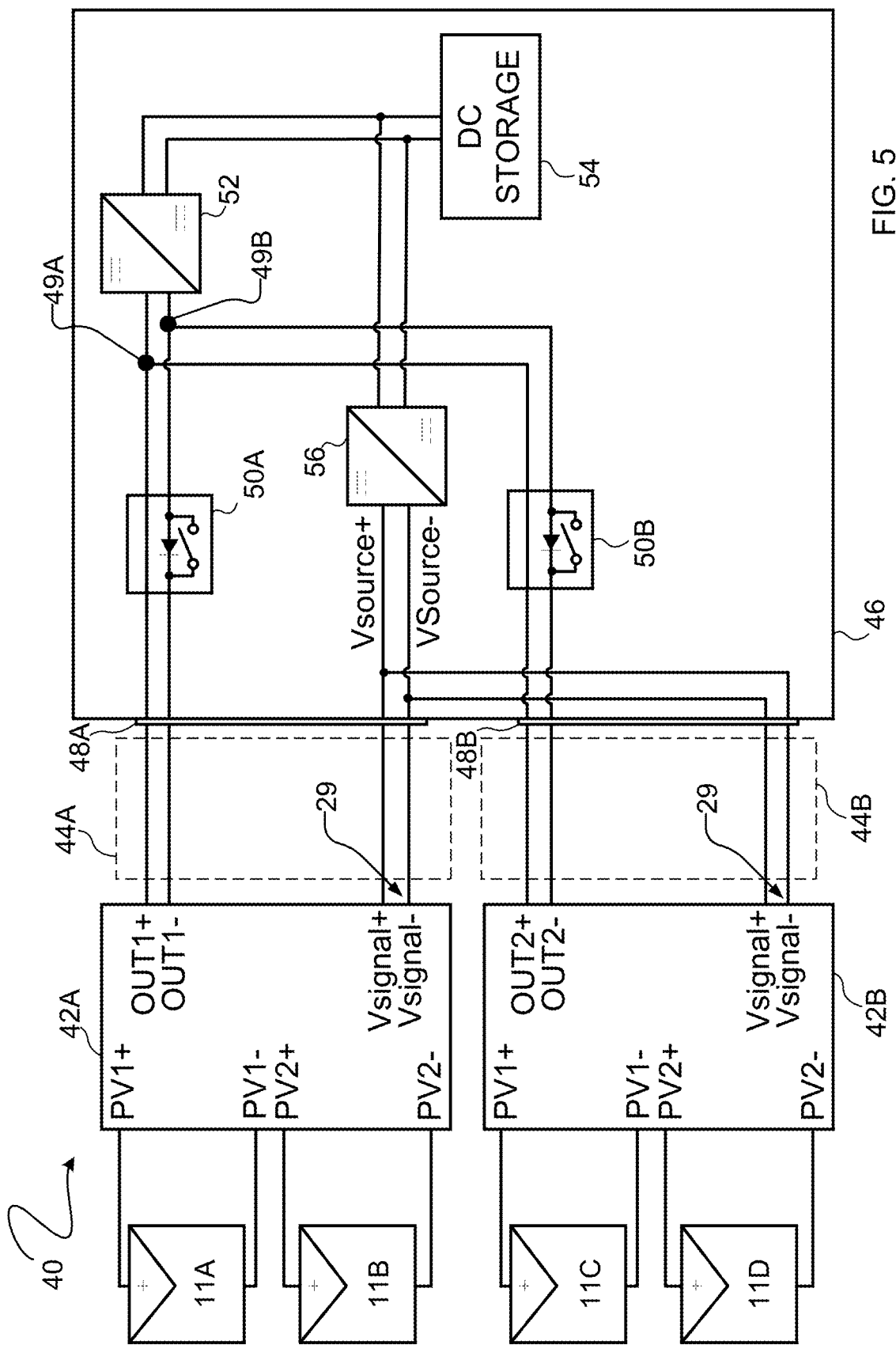
FIG. 5 illustrates a circuit diagram of a portable solar charging system comprising four solar panels connected to solar combiners and a portable power station according to a particular embodiment.

One or more solar combiners 42 (like solar combiner 42 shown in FIG. 4) may be used to provide a portable solar power (e.g. charging) system. FIG. 5 is a schematic illustration of a plurality (e.g. two) solar combiners 42A, 42B (collectively, combiners 42) which are connected (physically and electrically, via releasably connectable cables 44A, 44B (collectively, releasably connectable cables 44—shown schematically in FIG. 5 using dashed rectangles) and ports 48A, 48B (collectively, ports 48) to a portable power station 46 to provide a portable solar charging system 40 according to a particular embodiment. In the illustrated embodiment of FIG. 5, solar charging system comprises a set of four solar panels 11A, 11B, 11C, 11D (or four groups (each group a plurality) of solar panels), with a first pair of solar panels 11A, 11B connected to a first combiner 42A and a second pair of solar panels 11C, 11D connected to a second combiner 42B. Combiners 42 may have the configuration shown in FIG. 4. It will be appreciated that in other embodiments, different numbers of solar panels 11 and different numbers of combiners 42 may be provided.

In the illustrated embodiment of FIG. 5, each combiner 42 provides a pair of output ports which may correspond to ports 14A, 16B of the FIG. 4 combiner. In the FIG. 5 illustration, these combiner output ports are labelled ports OUT1+, OUT1− for combiner 42A and ports OUT2+, OUT2− for combiner 42B. In the illustrated embodiment of FIG. 5, combiners 42 are controlled by the same electrical control input signal 29 provided at control signal input ports $V_{signal+}$, $V_{signal-}$. In the illustrated embodiment of FIG. 5, releasably connectable cables 44A, 44B respectively releasably connect solar combiners 42A, 42B to portable power station 46. Releasably connectable cable 44A may transmit power from output ports OUT1+, OUT1− of combiner 42A to power station 46 and may transmit electrical control input signal 29 from power station 46 to control signal input ports $V_{signal+}$, $V_{signal-}$ of combiner 42A. Similarly, releasably connectable cable 44B may transmit power from output ports OUT2+, OUT2− of combiner 42B to power station 46 and may transmit electrical control input signal 29 from power station 46 to control signal input ports $V_{signal+}$, $V_{signal-}$ of combiner 42B.

Releasably connectable cables 44A, 44B may releasably connect to portable power station 46 at ports 48A, 48B, each of which may be provided in the form of one or more plugs and/or the like. In the illustrated embodiment of FIG. 5, releasably connectable cables 44A, 44B are hardwired to their respective combiners 42A, 42B. However, this is not necessary and, in some embodiments, releasably connectable cables 44A, 44B may releasably connect to their respective combiners 42A, 42B at suitable ports (not shown), each of which may be provided in the form of one or more plugs and/or the like.

In the illustrated embodiment of FIG. 5, within portable power station 46, the high-side power nodes of each combiner 42 (e.g. OUT1+ of combiner 42A and OUT2+ of combiner 42B) may be connected at node 49A and the low-side power nodes of each combiner 42 (e.g. OUT1− of combiner 42A and OUT2− of combiner 42B) may be connected at node 49B. Portable solar charging system 40 may comprise reverse current limiters 50A, 50B (collectively, reverse current limiters 50), which may prevent reverse currents between nodes 49A, 49B and combiners 42 in the case of voltage and/or current imbalances between combiners 42, which may be typical in cases where panels 11A, 11B, 11C and 11D receive different amounts of light. Reverse current limiters 50 may comprise active OR gate activated bypass circuits and are explained in more detail below.

Portable solar charging system 40 may comprise one or more reverse current limiters 50 for each solar combiner 42. In the case of the illustrated FIG. 5 embodiment, reverse current limiters 50 are shown as components of portable power station 46. This is not necessary. In some embodiments, current limiters 50 may be connected at other locations between the solid state switches (e.g. solid state switches 18A, 20A, 18B, 20B—see FIG. 4) of combiners 42 and nodes 49A, 49B. In the case of the embodiment illustrated in FIG. 5, the low-side output (OUT1−, OUT2−) of each solar combiner 42A, 42B is connected to a respective low-side reverse current limiter 50A, 50B. Low-side reverse current limiters 50A, 50B permit current flow in the direction from node 49B to their respective combiners 42A (port OUT1−), 42B (port OUT2−), but prevent reverse current flow from their respective combiners 42A, 42B to node 49B. Back flow of current (which is prevented by current limiters 50) can present a potential shock hazard, e.g. due to back flow causing energization at an exposed port 48 or other element.

Figure 6:
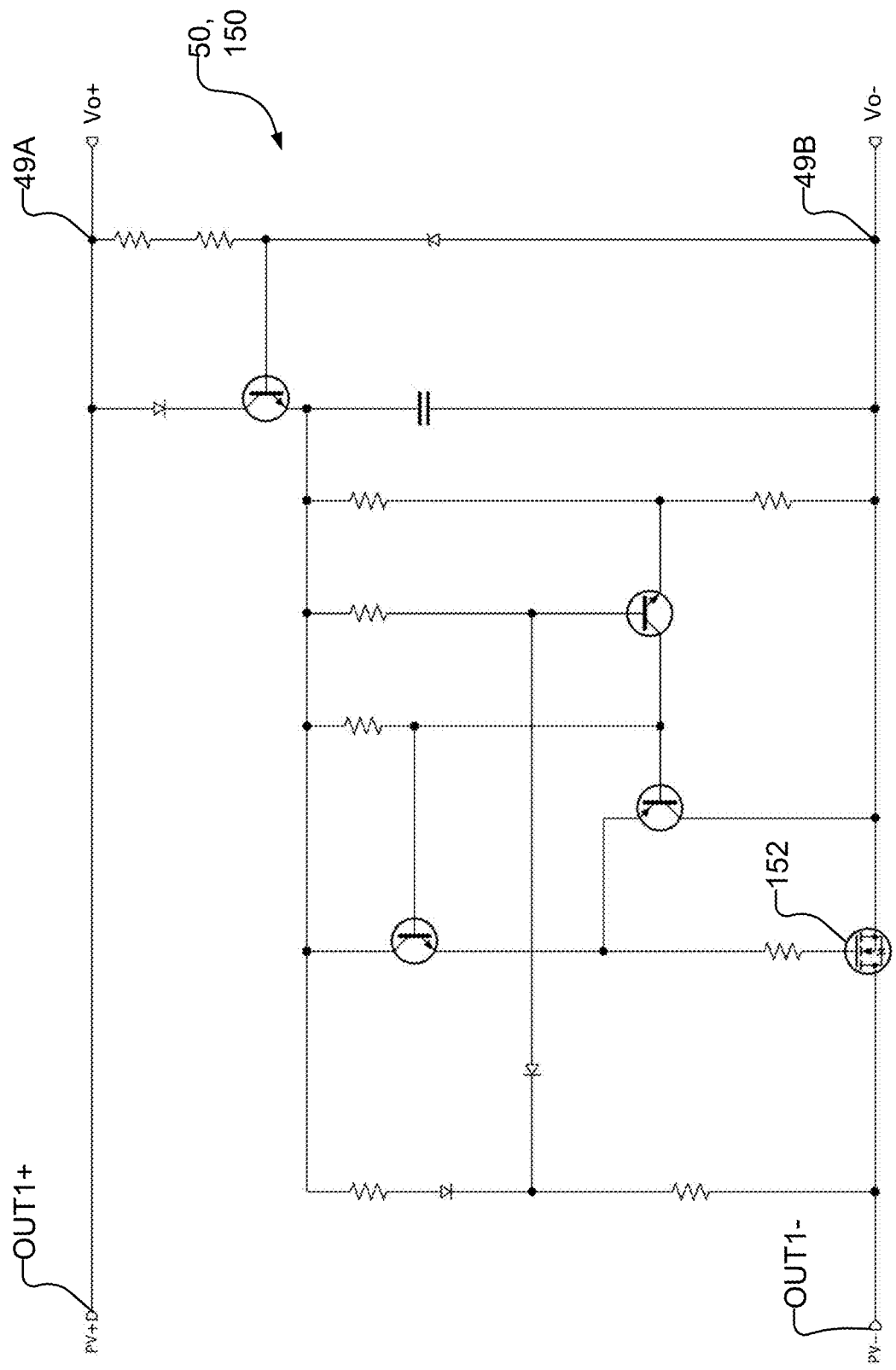
FIG. 6 illustrates a circuit diagram of an exemplary low-sider reverse current limiter according to a particular embodiment.

FIG. 6 schematically depicts a low-side reverse current limiter circuit 150 according to a particular embodiment. Circuit 150 may be used to provide one of low-side reverse current limiters 50 of the FIG. 5 embodiment and as described elsewhere herein. Low-side reverse current limiter circuit 150 allows electrical current to flow from node PV+ (which may be analogous to node OUT1+ of FIG. 5) to node Vo+ (which may be analogous to node 49A of FIG. 5) and from node Vo− (which may be analogous to node 49B of FIG. 5) to node PV− (which may be analogous to node OUT1− of FIG. 5). However, a low-side reverse current limiter circuit 150 prevents reverse low-side current flow (i.e. current flow from node PV− to node Vo−) by switching MOSFET 152 to an OFF (non-conducting) state when a reverse voltage polarity is sensed between input nodes PV+, PV− and output nodes Vo+, Vo− (e,g, when the voltage between output nodes Vo+, Vo− exceeds the voltage between input nodes PV+, PV−). Reverse current limiter circuit 150 may be referred to as "low-side" because the solid state switch of MOSFET 152 is provided on the low side or common-potential side of the circuit. In some embodiments, MOSFET 152 may be provided by some other form of switch (e.g. an electromechanical switch or some other form of transistor-based switch). As discussed elsewhere herein, reverse current limiters 50 of portable solar charging systems according to various embodiments may additionally or alternatively be provided as "high-side" current limiters (e.g. where the switch is provided on the high side of the circuit).

Providing reverse current limiters 50 may increase the safety of portable solar charging system 40 by reducing electrical hazards associated with reverse currents and/or unbalanced DC voltages.

Figure 7:
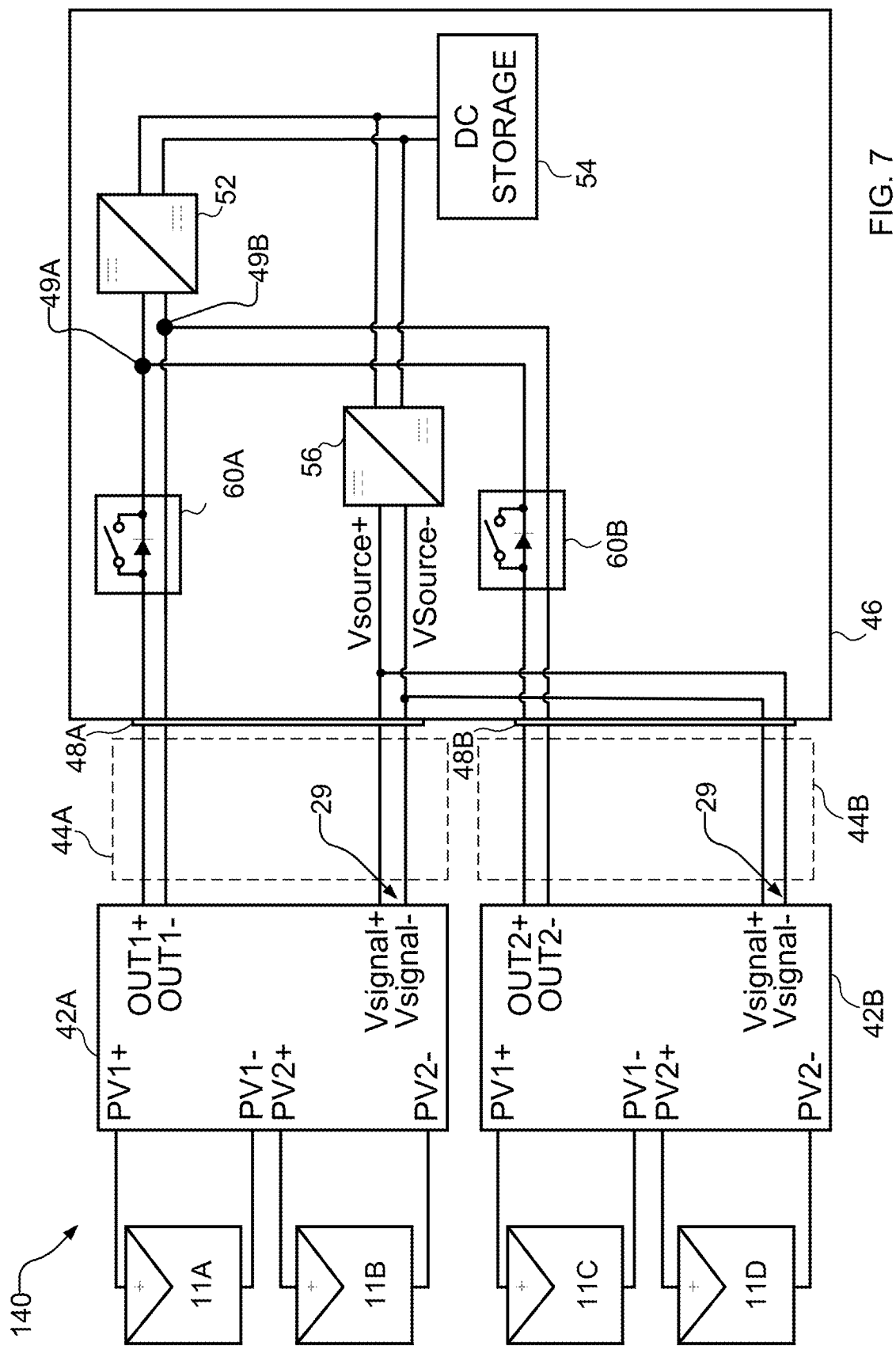
FIG. 7 illustrates a circuit diagram of a portable solar charging system according to a particular embodiment in which the portable power station comprises high-side reverse current limiters.

As discussed above, the illustrated solar charging system 40 of the embodiment shown in FIGS. 5 and 6 show low-side reverse current limiters 50 which permit current flow in the direction from node 49B to their respective combiners 42A (port OUT1−), 42B (port OUT2−), but prevent reverse current flow from their respective combiners 42A, 42B to node 49B. FIG. 7 shows a solar charging system 140 according to an example embodiment. In many respects, solar charging system 140 of the FIG. 7 embodiment is similar to solar charging system 40 of FIG. 5 and similar reference numerals are used to refer to similar components. Solar charging system 140 (of FIG. 7) differs from solar charging system 40 (of FIG. 5) in that solar charging system 140 comprises high-side reverse current limiters 60A, 60B (collectively, high-side reverse current limiters 60). More specifically, in the case of solar charging system 140 in the illustrated embodiment of FIG. 7, the high-side output (OUT1+, OUT2+) of each solar combiner 42A, 42B is connected to a respective high-side reverse current limiter 60A, 60B. High-side reverse current limiters 60A, 60B permit current flow in the direction from their respective combiners 42A (port OUT1+), 42B (port OUT2+) to node 49A, but prevent reverse current flow from node 49A to their respective combiners 42A, 42B. In other respects, solar charging system 140 is similar to solar charging system 40 described herein and, unless the context dictates otherwise, features of solar charging system 40 described herein should be understood to be applicable to solar charging system 140.

Figure 8:
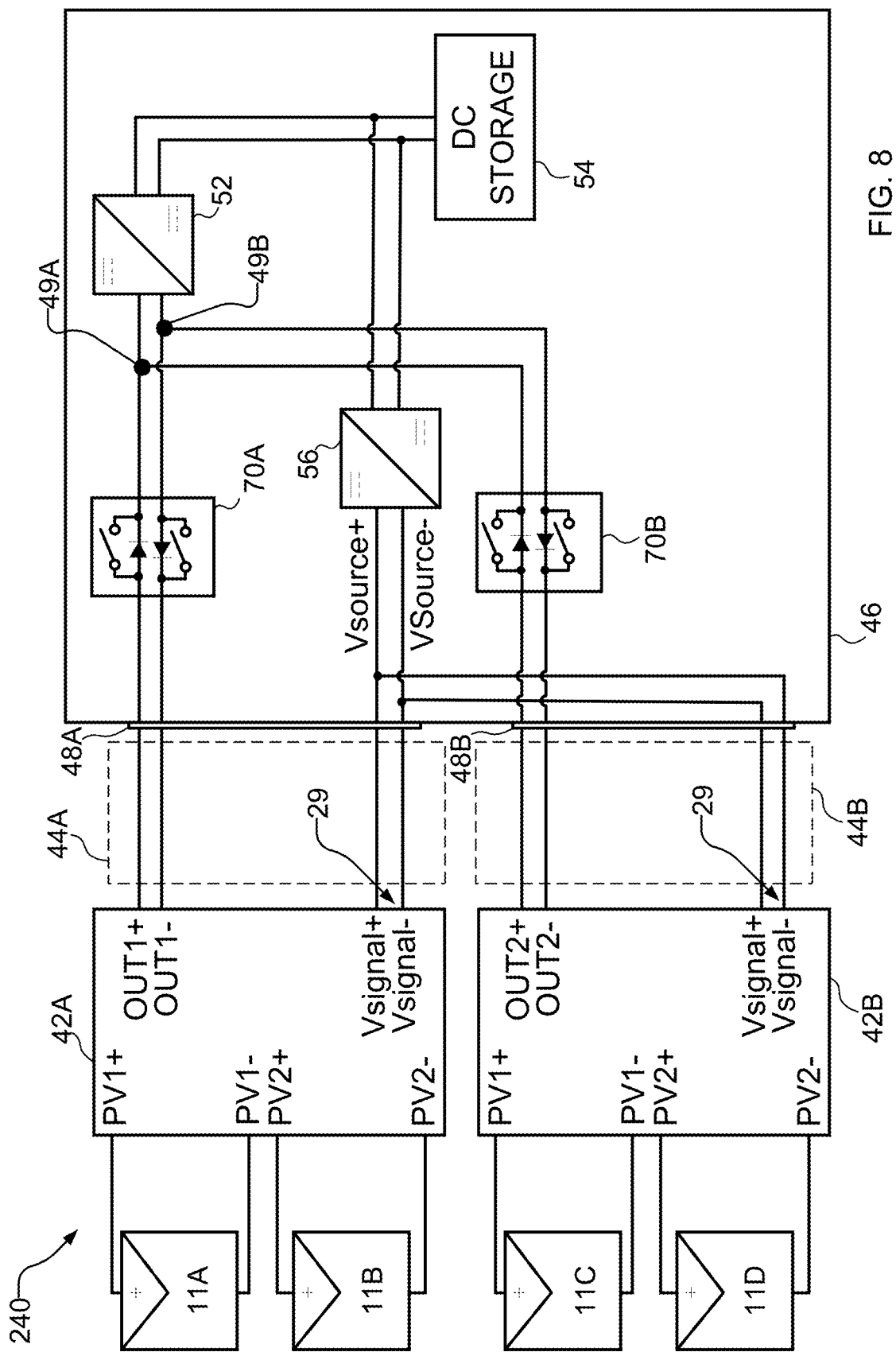
FIG. 8 illustrates a circuit diagram of a portable solar charging system according to a particular embodiment in which the portable power station comprises both high-side and low-side reverse current limiters.

FIG. 8 shows a solar charging system 240 according to another example embodiment. In many respects, solar charging system 240 of the FIG. 8 embodiment is similar to solar charging system 40 of FIG. 5 and similar reference numerals are used to refer to similar components. Solar charging system 240 (of FIG. 8) differs from solar charging system 40 (of FIG. 5) in that solar charging system 240 comprises low-side and high-side reverse current limiters 70A, 70B. In other respects, solar charging system 240 is similar to solar charging system 40 described herein and, unless the context dictates otherwise, features of solar charging system 40 described herein should be understood to be applicable to solar charging system 240.

Referring back to FIG. 5, charging controller 52 converts the combined energy from solar combiners 42 received at nodes 49A, 49B via ports 48A, 48B to a regulated voltage and current suitable for charging DC energy storage element 54 (e.g. a battery and/or the like). For example, charging controller 52 may step down the voltage between nodes 49A, 49B to a voltage suitable for charging DC storage element 54, e.g. 12V/24V.

Isolated power supply 56 (which, in the illustrated embodiment is part of portable power station 46) provides an enable signal between nodes $V_{source+}$, $V_{source-}$ to solar combiners 42 at their respective $V_{signal+}$, $V_{signal-}$ ports. This enable signal supplies input signal voltage 29 (at the $V_{signal+}$, $V_{signal-}$ ports of combiners 42) which controls the operation of solid state switches 18, 20 in the electrical transmission safety systems 10 described with reference to FIGS. 1-4. More specifically, input control signal 29 causes solid state switches 18, 20 of electrical transmission safety systems 10 to activate their respective outputs by turning switches 18, 20 into ON (conducting) states after releasable cables 44A, 44B are connected to portable power station 46 at ports 48A, 48B. Conversely, if cables 44A, 44B are disconnected from portable power station 46 or if input control signal 29 otherwise goes low, then solid state switches 18, 20 of electrical transmission safety systems 10 electrically disconnect their respective outputs by turning switches 18, 20 into OFF (non-conducting) states.

DC storage element 54 may comprise of one or more rechargeable lithium ion batteries, or other storage medium capable of storing and releasing electrical energy. Isolated power supply 56 may regulate the voltage and current generated from DC storage element 54 before outputting input control signal 29. Isolated power supply 56 may regulate the voltage/current to a voltage and/or current suitable as switch control signal 29 for electrical transmission safety systems 10 in solar combiners 42. This may comprise stepping down the voltage from DC storage element 54 and may incorporate a current limiting element. A current limiting element in isolated power supply 56 or in series with connected ports 48A, 48B may reduce risk to personnel and materials in the circumstance that there is a problem with cabling carrying switch control signal 29 and increase reliability in case of damage to the connectors of ports 48A, 48B or cables 44A, 44B.

Figure 9:
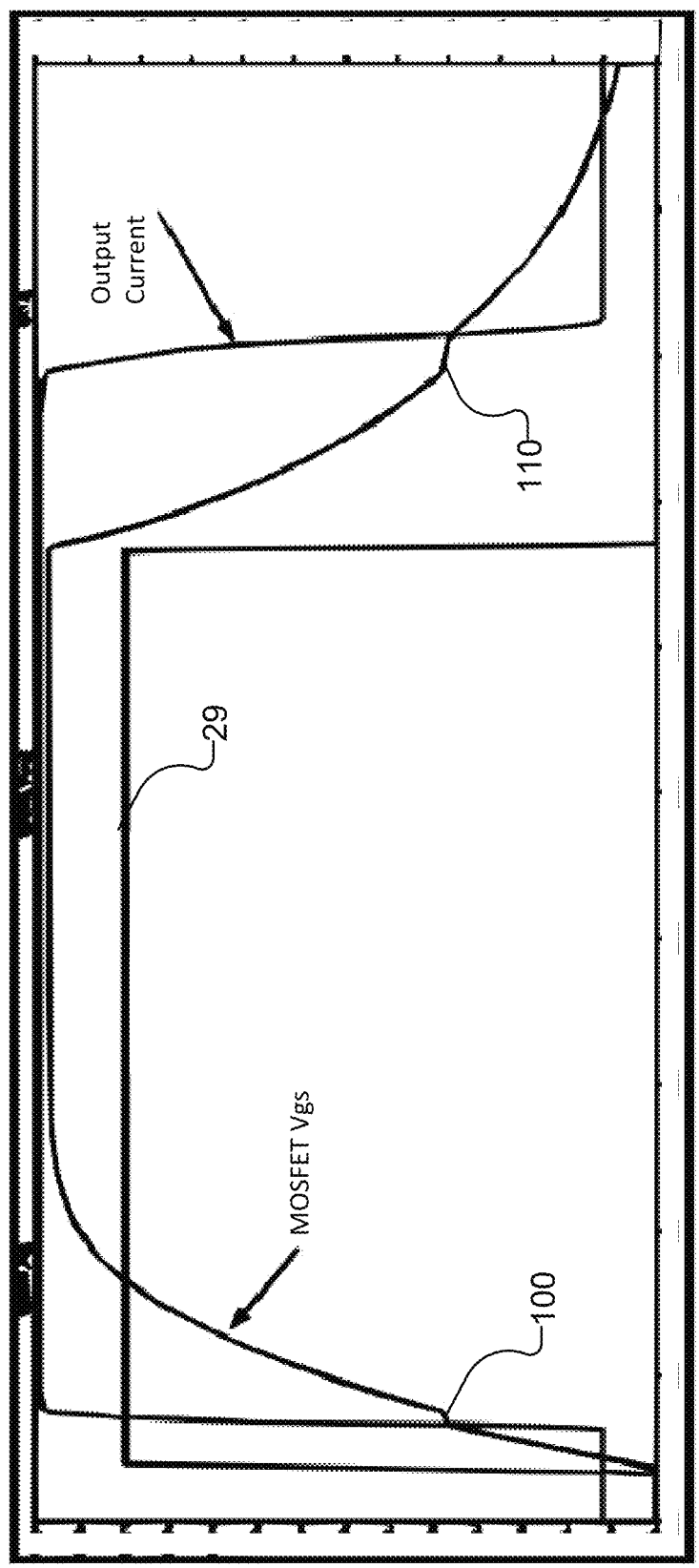
FIG. 9 is a plot of voltage across a solid state switch of an electrical transmission safety system, the input signal voltage Vsignal of the electrical transmission safety system, and the resultant output current flow in through a port controlled by the solid state switch.

FIG. 9 illustrates the simulation of the operation of electrical transmission safety system 10 according to an embodiment. Referring simultaneously to FIG. 1, signal voltage 29 is delivered to optocoupler 24 to generate an electrically isolated switch control signal 34A, 34B (shown as MOSFET Vgs in FIG. 9) to solid state switch 18, 20. MOSFET Vgs increases at a characteristic rate towards its maximum level. When MOSFET Vgs reaches a threshold level (shown at kink 100 in MOSFET Vgs signal in FIG. 9), this triggers MOSFET solid state switch 18, 20 to close the circuit (switch to an ON (conducting state), permitting the conduction of electrical power through the MOSFET switch 18, 20 to load 13 (see FIG. 1), which is seen in FIG. 9 as the increase of output current to its maximum.

When signal 29 is removed, MOSFET Vgs is no longer generated by optocoupler 24, and MOSFET Vgs exponentially decreases. When MOSFET Vgs decreases to the threshold level (shown at second kink 110 in MOSFET Vgs signal in FIG. 9) again, this triggers the opening of solid state switch 18, 20, switching solid state switch 18, 20 to an OFF (non-conducting) state and electrically disconnecting power from load 13 (i.e. preventing the conduction of electrical power to load 13).

Figure 10A:
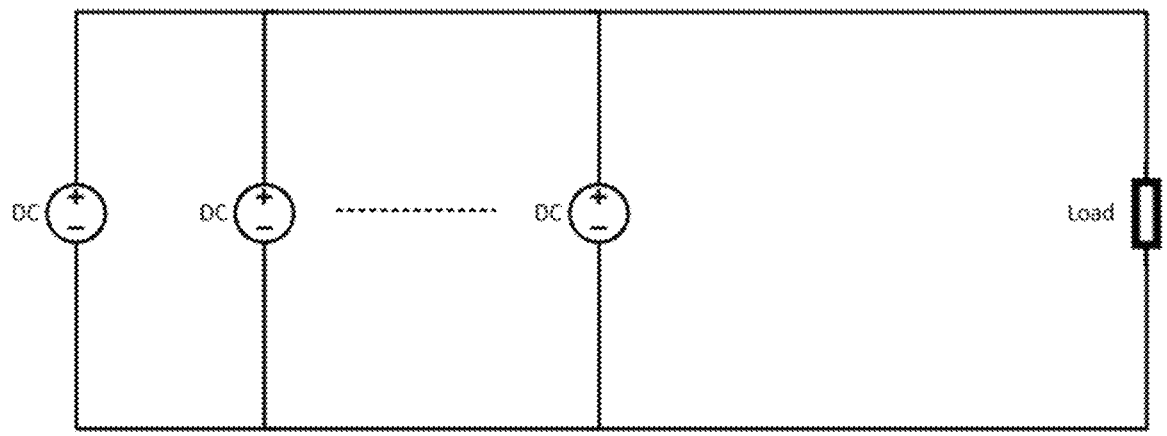
FIG. 10A illustrates prior art voltage sources connected to a single load with no reverse current protection.
Figure 10B:
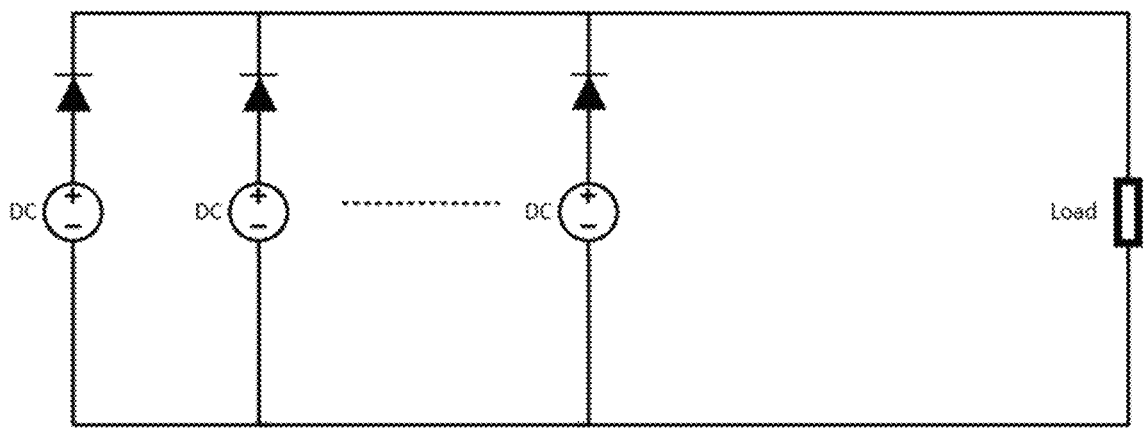
FIG. 10B illustrates prior art voltage sources connected to a single load with diode protection.

Various embodiments of reverse current limiters (e.g. reverse current limiters 50 (FIG. 5), reverse current limiters 60 (FIG. 7) and reverse current limiters 70 (FIG. 8) are now described in more particular detail. Photovoltaic power systems such as those discussed herein plurality of independent voltage sources connected to a single load, for example as seen in FIG. 10A. In such systems, if the voltage sources do not have a system for preventing reverse current flow, current will flow between the voltage source, wasting power and potentially causing damage one or more of the voltage sources or associated circuitry and conductors. To prevent reverse current flow, the most common technique is to install diodes on each voltage source, for example as illustrated in FIG. 10B, with current flowing from anode to cathode. Forward biased diodes result in a voltage drop with associated power loss across the diode that typically increases approximately linearly with current. For many applications, the power loss across the diode is significant, making it impractical as a solution for preventing current flow between voltage sources.

Figure 11:
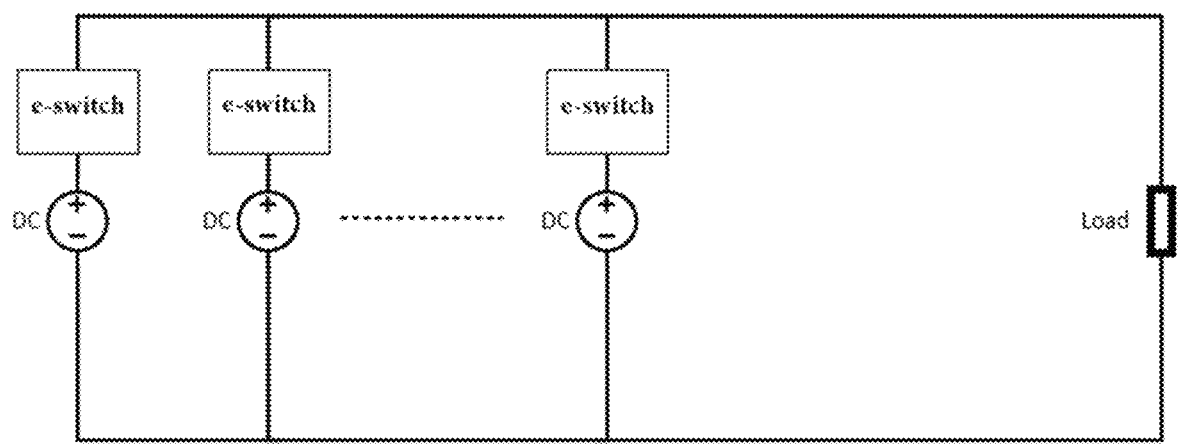
FIG. 11 illustrates block diagram representation of the use of e-switches as reverse current limiters in an array of variable DC sources connected to a single load according to a particular embodiment of the present invention.
Figure 12A:
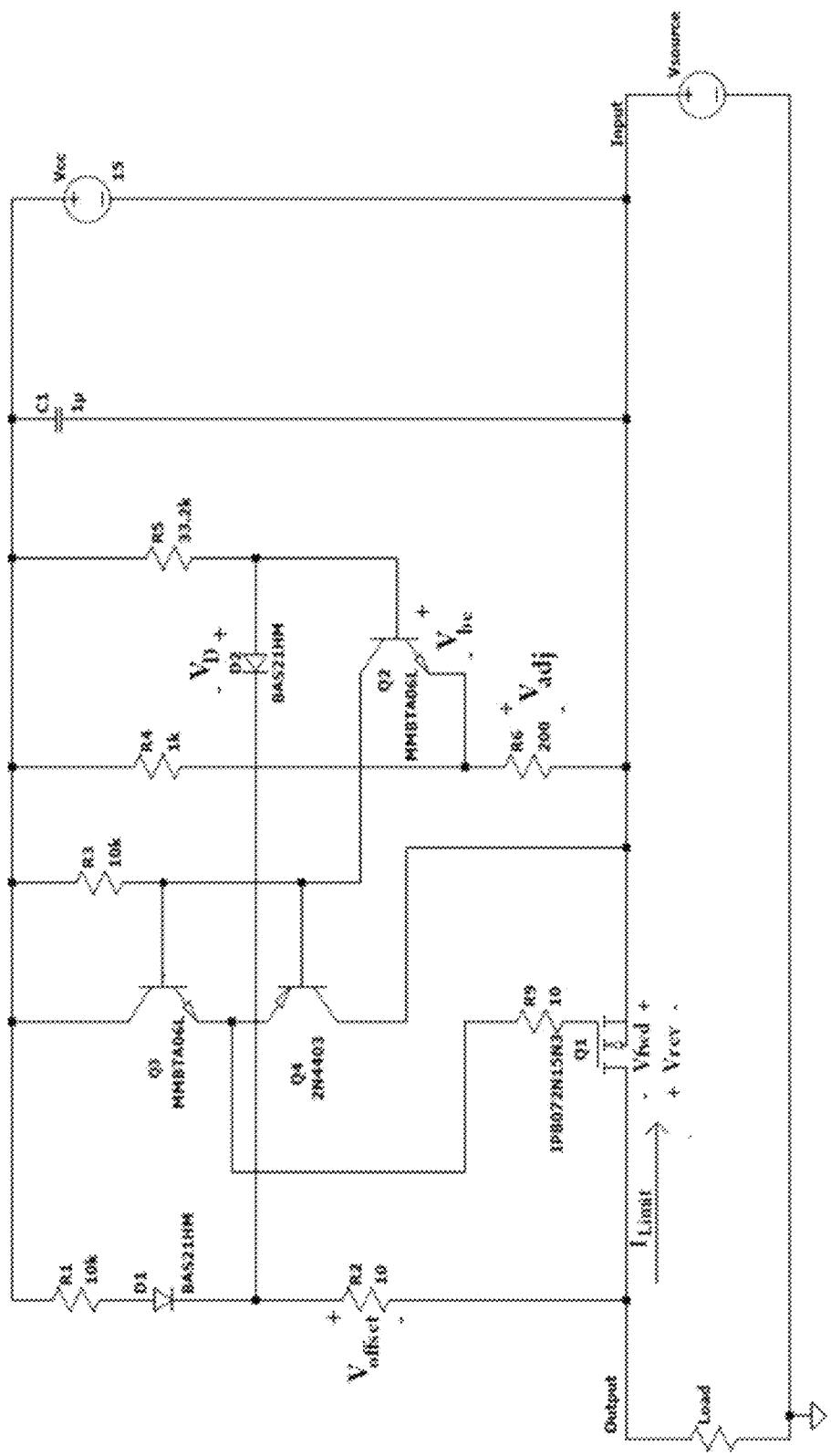
FIG. 12A illustrates a circuit diagram of an example high-side reverse current limiter circuit according to a particular embodiment.
Figure 13:
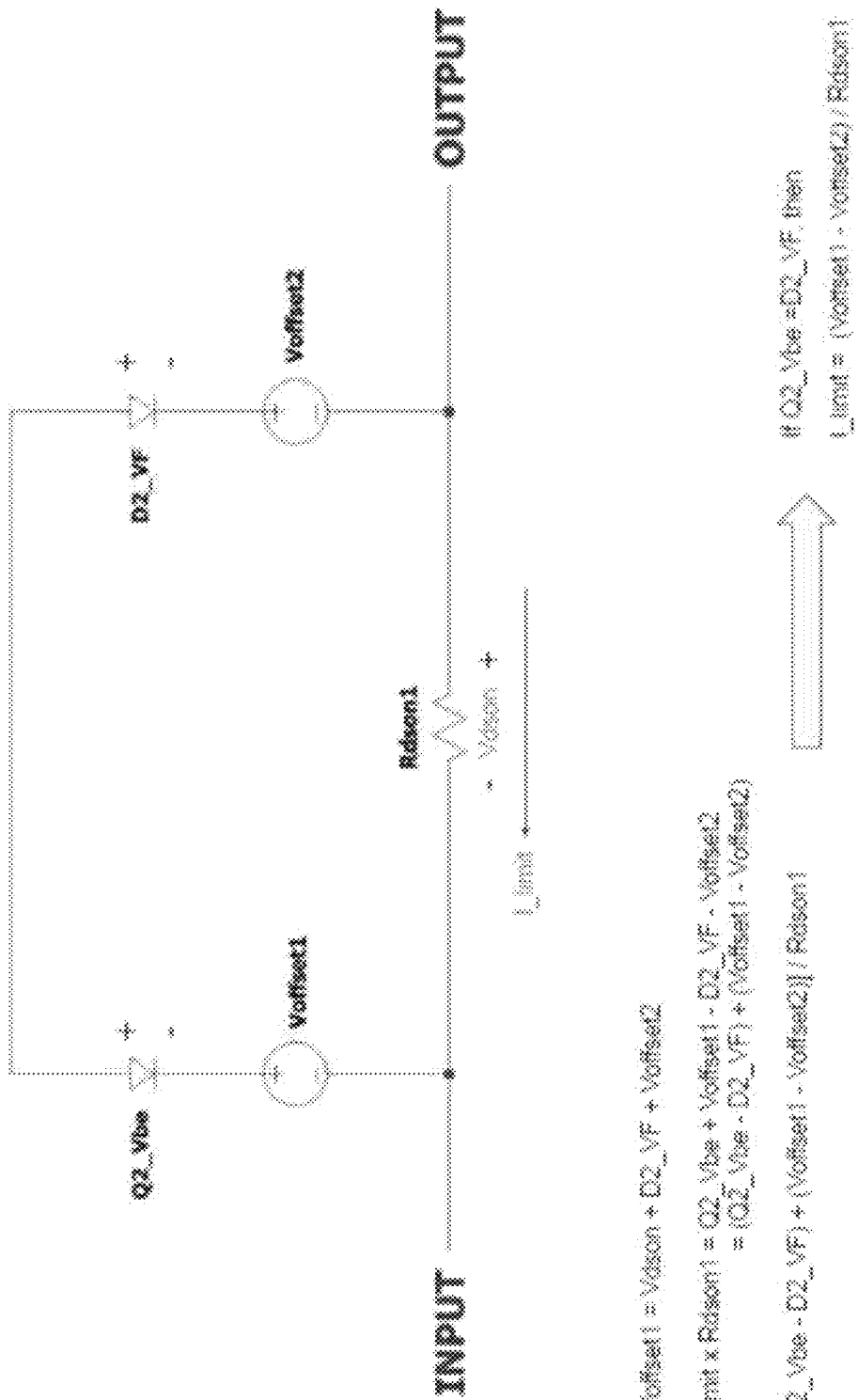
FIG. 13 Illustrates a simplified equivalent circuit diagram of the FIG. 12A high-side reverse current limiter according to an example embodiment.

Particular embodiment of the invention described herein incorporate reverse current limiting circuits (reverse current limiters) which help to address these issues with the reverse currents associated with the connection of multiple independent photovoltaic panels to a common load. FIG. 12A shows a circuit diagram of a high-side reverse current limiter circuit according to a particular embodiment and FIG. 13 is a simplified equivalent circuit diagram corresponding to the FIG. 12A high-side reverse current limiter according to a particular embodiment. The FIG. 12A/13 high-side reverse current limiter may be incorporated, for example, into portable solar charging systems 140 (e.g. reverse current limiters 60—see FIG. 7) and/or into portable solar charging systems 240 (e.g. as part of reverse current limiters 70—see FIG. 8). FIG. 12A shows a single voltage input source (Vsource) for simplicity, but it will be appreciated that in a typical application, Vsource will comprise a plurality of independent voltage sources (e.g. photovoltaic panels). It will be appreciated that to connect additional voltage sources, additional instances of the FIG. 12A reverse current limiter circuit may be connected in series with each additional voltage source and the voltage sources with their corresponding reverse current-limiting circuits may be connected in parallel as shown in FIG. 11 (where the parallel-connected voltage sources are shown serially connected to "e-switch" components in FIG. 11, where the "e-switch" components represent reverse current limiting circuits).

The FIG. 12A high-side reverse current limiter embodiment employs at least one MOSFET Q1 as the active component that can prevent or allow voltage source $V_{source}$ to be applied to the load, depending on whether the gate voltage applied to Q1 is, respectively, insufficient or sufficient to allow current flow between the drain and source of Q1. Additional components and circuit elements as described below may detect (or respond to) fault conditions and appropriately adjust the gate voltage applied to Q1 in response. Component values and semiconductor model numbers in FIG. 12A are merely representative of typical circuit components as used in a practical application; similar components can be substituted for those shown in the illustrated embodiment. In addition, with minor adjustments to the FIG. 12A reverse current limiter circuit, additional MOSFETs can be added to the circuit with drains and sources electrically connected in parallel with those of Q1, and with suitable gate bias, to increase the current capacity of the circuit. Transistors Q3 and Q4, are connected in a "totem pole" pairing of NPN and PNP bipolar transistors, and drive the controlling gate voltage for Q1, as well as acting to rapidly discharge any stored charge in the internal capacitance of Q1 to allow for rapid state switching of Q1 in response to controlled current. The mutual base voltages of Q3 and Q4 are controlled by the collector output of driver transistor Q2, which, in the illustrated embodiment, is also a conventional bipolar transistor.

Notably, the FIG. 12A reverse current limiter circuit uses an applied voltage $V_{cc}$ that that is (or may be) independent of the input voltage source $V_{source}$ that is under control, and can be floating relative to ground. This connection of $V_{cc}$ that is floating relative to ground may increase the resilience of the circuit against input voltage transients, as described below. In the illustrated reverse current limiter circuit of FIG. 12A, a typical $V_{cc}$ value of 15V is shown, but other $V_{cc}$ values may be utilized, in particular higher applied voltages, with appropriate modification of biasing resistors R1-R6 and Q1 gate series resistor R9. The low voltage limit that can be used for $V_{cc}$ using the 12A reverse current limiter circuit may appear to be limited by suitable "on" gate-source voltage of MOSFET Q1, which is typically 9-12V, plus suitable biasing voltage for the other semiconductor components. However, in a case where a lower $V_{cc}$ is desired, for example to reduce power requirements or to utilize an available standard bus voltage such as a 5V supply for $V_{cc}$, a separate applied voltage can be used to drive the gate of Q1 to an ON state by the totem pole transistors Q3 and Q4.

Diode D2 is a blocking diode in the FIG. 12A circuit in that D2 prevents any large voltage present across the primary switch Q1 drain-source from appearing across the transistor Q2 base-emitter junction, which would impair the desired functionality of the circuit; there would be no blocking capabilities and Q2 would persist in an ON state, or potentially be destroyed for any voltage greater than a few volts.

Diode D1 also serves as a blocking diode, protecting the circuit power supply $V_{cc}$ as well as other components. The FIG. 12A circuit, with components as shown, can handle at least 150V at its output and is only limited by Q1's blocking voltage, which can be thousands of volts.

FIG. 12A operates such that reverse current (denoted $I_{Limit}$ in FIG. 12A), which might occur from voltages at the output node which are greater than input voltage $V_{source}$, cause the gate voltage at Q1 to drop and effectively shut off Q1, which is the desired result in that case. However, desired negative values of $I_{Limit}$ allow Q1 to turn on as desired.

The FIG. 12A reverse current limiter circuit can operate in a number of operational sates including: a zero current state; a forward current state; and a reverse current state.

In the case of zero current from input to output, bipolar transistor Q2 is normally OFF since the base-emitter voltage of Q2, $V_{be}$, is set to be equal to $V_D+V_{offset}+V_{fwd}-V_{adj}$. Here $V_{fwd}$ is the voltage of the body diode of MOSFET Q1. $V_{fwd}$ of a MOSFET, such as Q1, is relatively high compared to $V_d$ and $V_{offset}$. These voltages result in a $V_{be}$ of switch Q2 lower than its $V_{be}$ threshold value, resulting in Q2 being in an OFF (non-conducting) state. Therefore, switch Q1 is biased ON and operating in conduction mode.

In a forward current operating mode (current is moving right to left in FIG. 12A), Q2 is OFF as the result of $V_{be}=V_d+V_{offset}+V_{fwd}-V_{adj}$ across Q1. These voltages result in $V_{be}$ voltage of Q2 lower than its ON threshold value resulting in Q2 being in an OFF (non-conducting) state. Therefore, switch MOSFET Q1 is biased ON and operating in conduction mode.

In a reverse current state (current is moving left to right in FIG. 12A) bipolar transistor Q2 will switch ON as the result of $V_{be}=V_d+V_{offset}+V_{rev}-V_{adj}$ across MOSFET Q1. Note the sign of the voltage drop across Q1 is reversed from the forward current state. This results in the $V_{be}$ voltage of Q2 higher than its ON threshold value resulting in Q2 being in an ON (conducting) state. Therefore, Q1 is pulled to an OFF non-conducting state and current flow through Q1 is blocked; its gate is pulled to its source potential. Note that when Q1 is switched OFF due to reverse current flow, its corresponding $V_{rev}$ value will increase to the entire load voltage potential (which might otherwise cause reverse current) resulting in switch Q1 being latched off until the high voltage potential reverse current is removed.

Figure 12B:
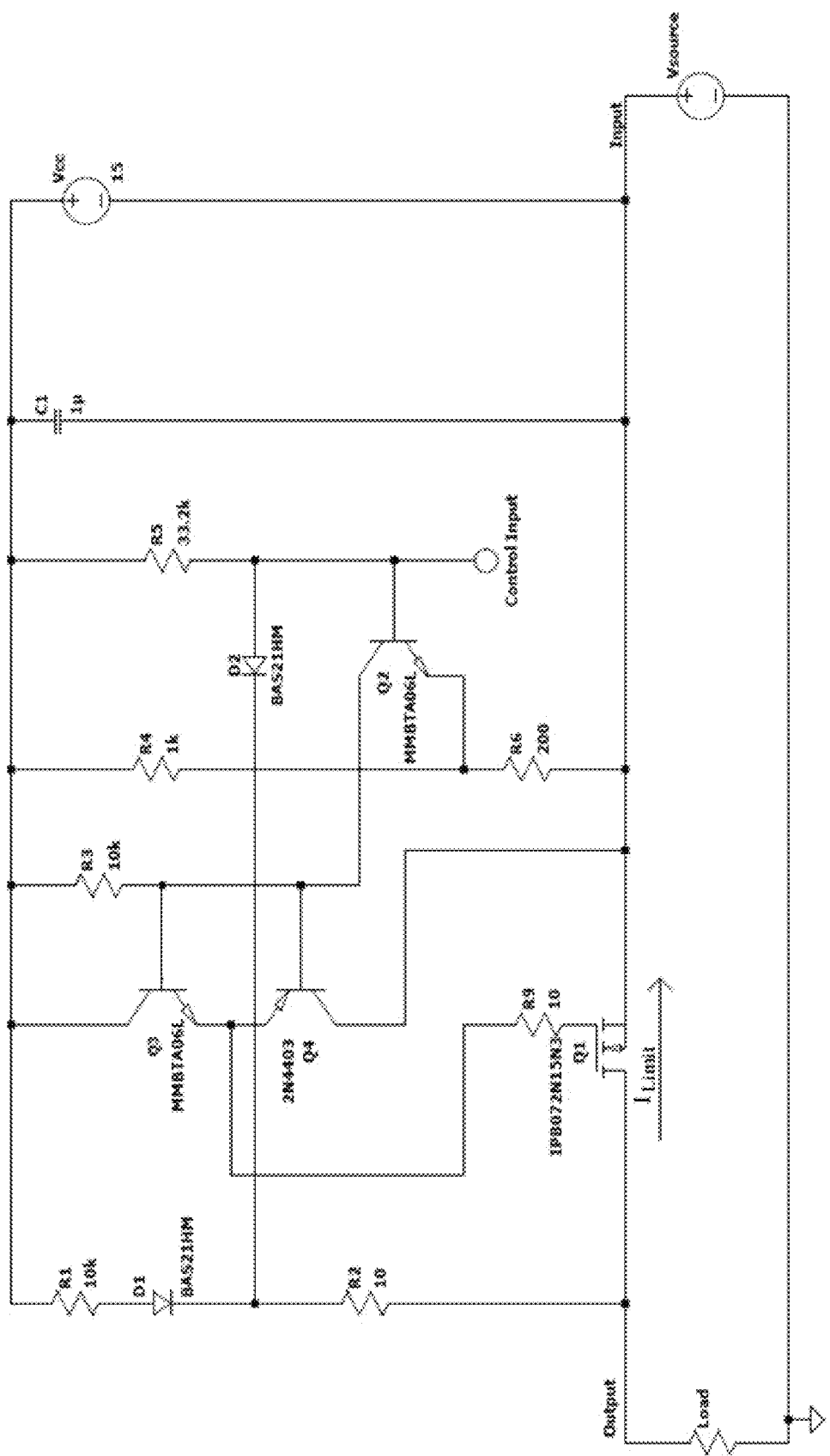
FIG. 12B is a circuit diagram of another example high-side reverse current limiter circuit having a control input for use in connecting external sensors and other inputs for external control of the reverse current limiter according to another particular embodiment.

A reverse current limiter circuit can be controlled through the addition of control inputs. FIG. 12B shows the reverse current limiter circuit of FIG. 12A with an added Control Input connection point at the base of transistor Q2. This Control Input provides for further applications of the e-switch provided by the reverse current limiter circuit, in that the state of Q1 may be controlled by external voltages applied at that control point, using signals with low voltage levels, such as are available from TTL (transistor-transistor logic) and/or the like. For example, the controlled current through the Q1 drain to source can effectively be turned on or off through voltages applied at the illustrated FIG. 12B Control Input, which Control Input voltages can be derived from external sources, such as Hall Effect sensor(s) measuring total output current, timers, and/or remote sensors which may sense other parameters, such as temperature, vibration, or position, with appropriate processing of the output of said sensors into a voltage range to suit the desired control action.

It is further noted that by varying resistors R4 and R6, the behavior of the reverse current limited circuit can be tailored such that the circuit turns off Q1 at a desired set point ($I_{rev}$) for threshold (e.g. non-zero) reverse current values. Table 1 below represents the calculation of such a set point $I_{rev}$, with example values. To set exact desired set point thresholds, the various resistors can be calibrated for desired values of set point current $I_{rev}$. Such calibration overcomes typical variations in circuit element performance, and may be used for precise current limiting at a specific current.

TABLE 1

| | | | Vrev + Voffset + Vd − Vadj > Vbe | | | | |
|---|---|---|---|---|---|---|---|
| 1) | Vrev | + | Voffset | + Vd − | Vadj | > | Vbe |
| 2) | Irev × Rds | + | (15 v − Vd3) × R2/(R1 + R2) | + Vd − | 15 V × R6/(R6 + R4) | > | Vbe |
| 3) | Irev × 0.0053 | + | (15 v − 0.61) × 10/(10,000 + 10) | + ~0.56 v − | 15 V × 200/(200 + 1000) | > | 0.75 v |
| 4) | Irev × 0.0053 | + | ~0.015 v | + ~0.56 v − | 2.5 v | > | 0.75 v |
| | ~2.83 v | | | | | | |
| | | | Irev = 535 Amps | | | | |

The Table 1 calculation is an example, where there is a desire to limit the reverse current to a non-zero value $I_{rev}$=535A. The Table 1 calculation solves the equation in a series of 4 steps by asserting (e.g. choosing) various resistance values.

The reverse current limiter circuits of the various embodiments described herein may be tolerant to high transient voltages, such as might arise from lightning, electrostatic discharge, switching and interconnection transients, and/or other causes. Solutions using ASIC chips or other circuits referenced to system ground with small silicon footprints may be susceptible to malfunction in the face of such voltage transients. Reverse current limiter circuits according to various embodiments comprise discrete components with high impedance inputs, such as blocking diodes D1 and D2 of the FIG. 12A circuit, which prevent voltage transients across the Q1 drain-source from being experienced by the other components of circuit. The entire circuit is also "floating" relative to the system ground potential and any earth bond. As a result, the only voltage transient events that the circuit would see applied via the controlled source and load nodes are therefore across the switch transistor Q1. A voltage transient event from source-drain would conduct across the internal body diode of MOSFET Q1 and dissipate.

A voltage transient event at the drain-source of Q1 would be blocked by diodes D1 and D2 from entering (being experienced by the other components of) the circuit, and very high transient voltage events across the Q1 drain-source would cause Q1 to go into avalanche-breakdown before any damage occurs to the circuit.

Current limiting circuits according to various embodiments can be implemented in ways having equivalent function but different components to the circuits of FIGS. 12A, 12B, such as replacement of certain discrete components with integrated circuits, or by replacement of specific semiconductors with others, so as to achieve different performance criteria regarding currents and voltages and speed or other application demands, such as thermal regulation, temperature uniformity and/or the like. FIGS. 14-18, while not restricting the generality of these embodiments of the present invention, provide several examples of other embodiments of the invention. For simplicity, the express illustration of the input voltage source and output load have been omitted from FIGS. 14-18.

Figure 14:
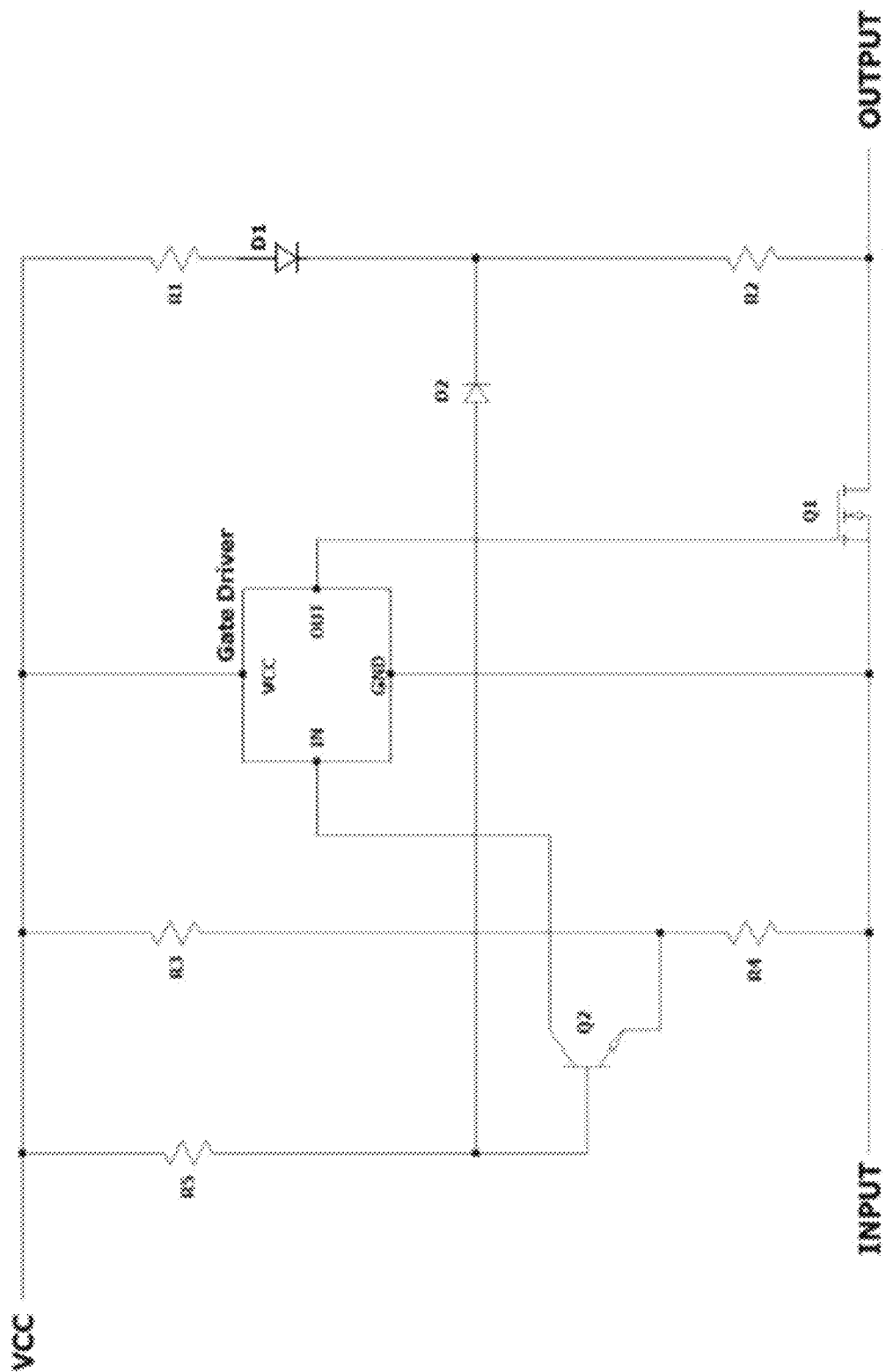
FIGS. 14 to 18 are circuit diagrams of further embodiments of the present invention.
Figure 15:
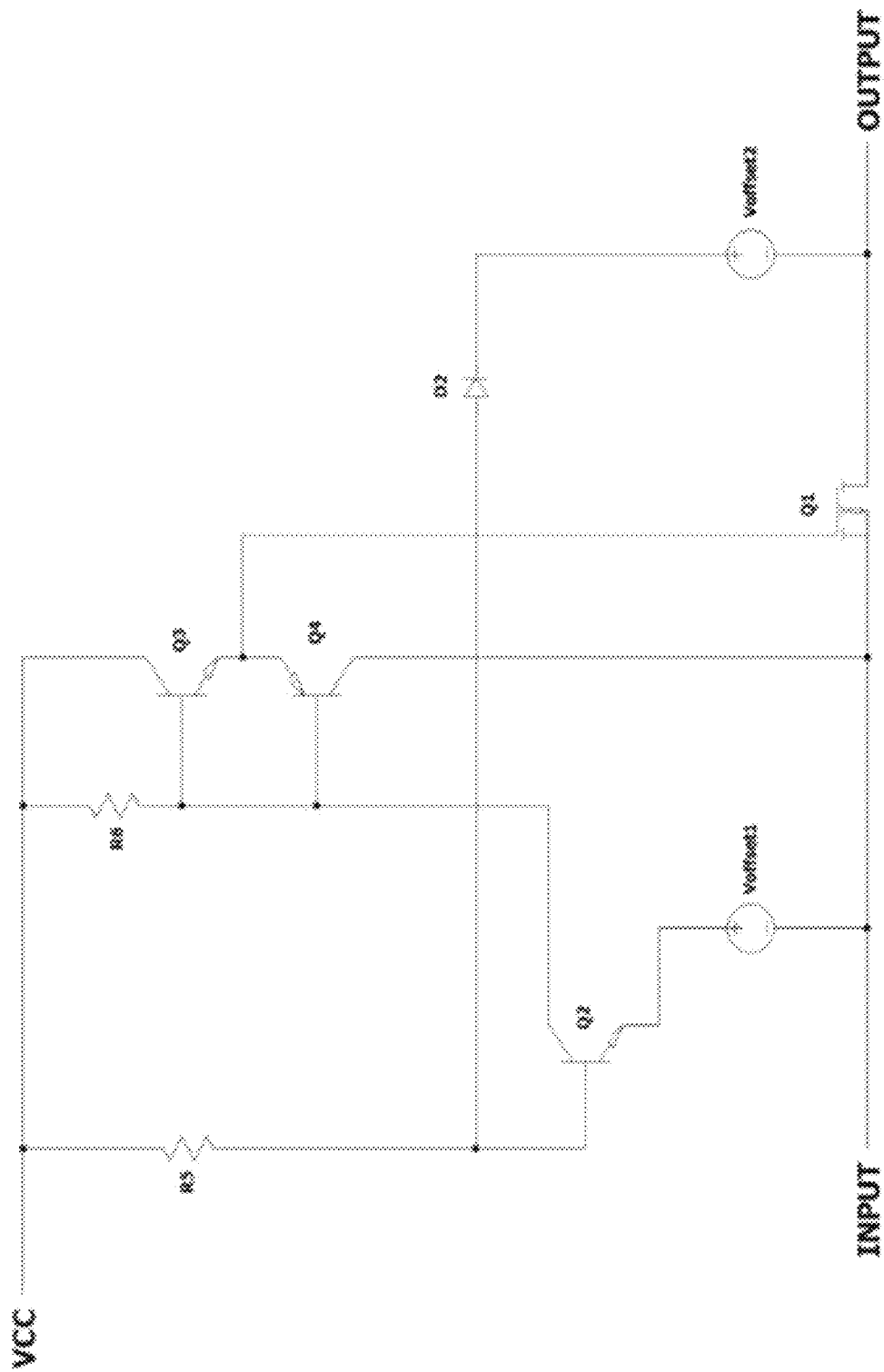
Figure 16:
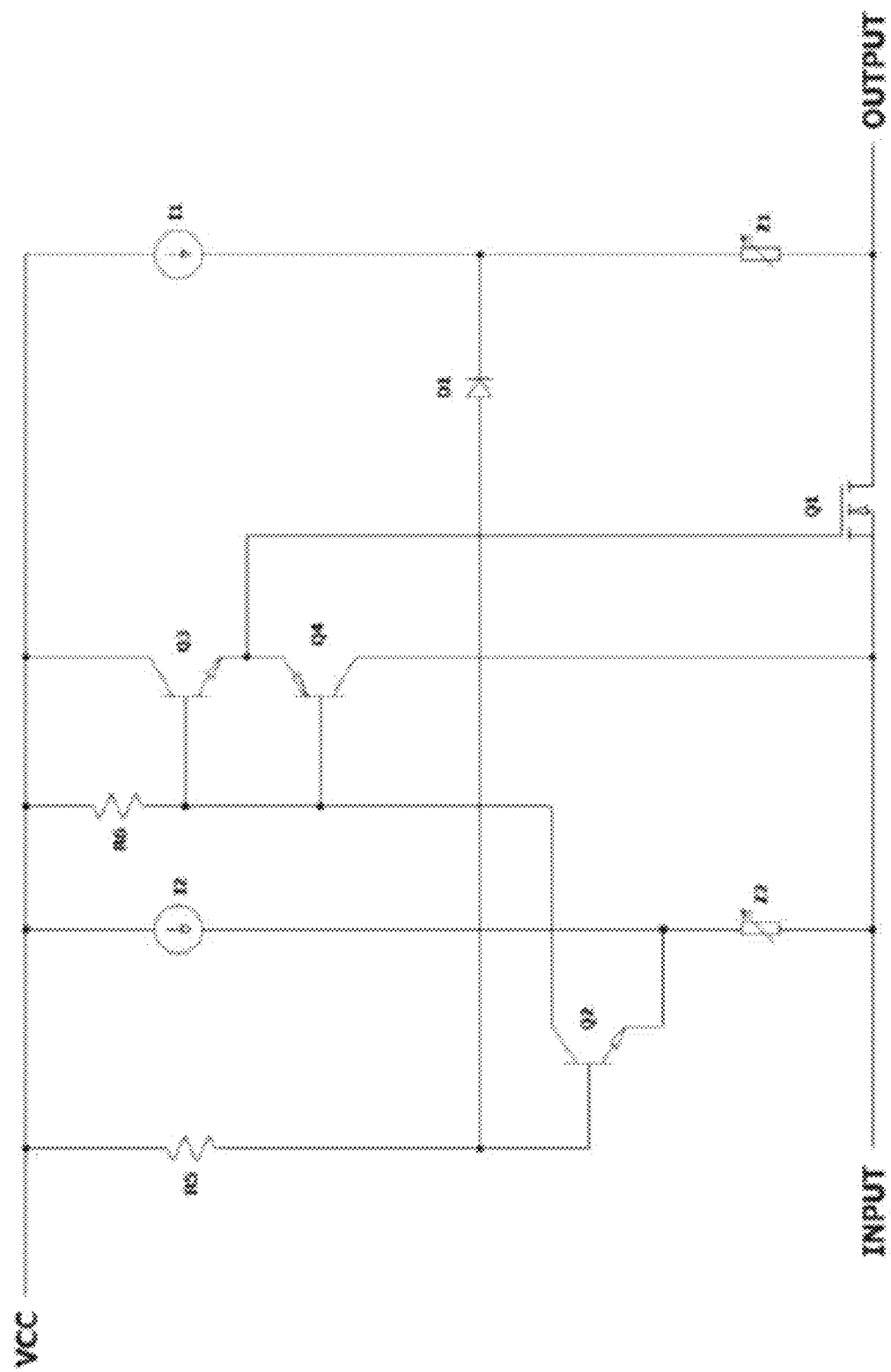
Figure 17:
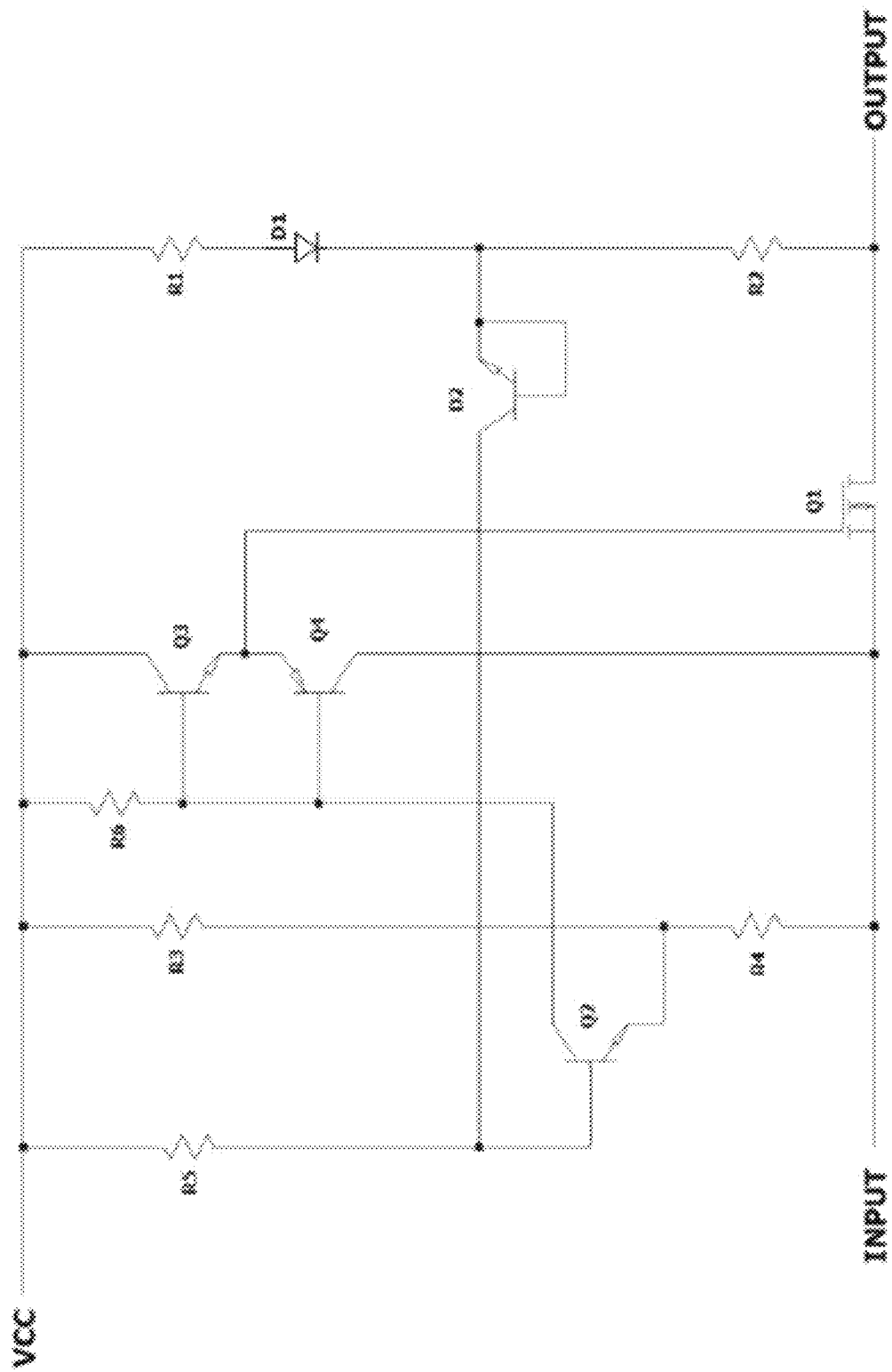
Figure 18:
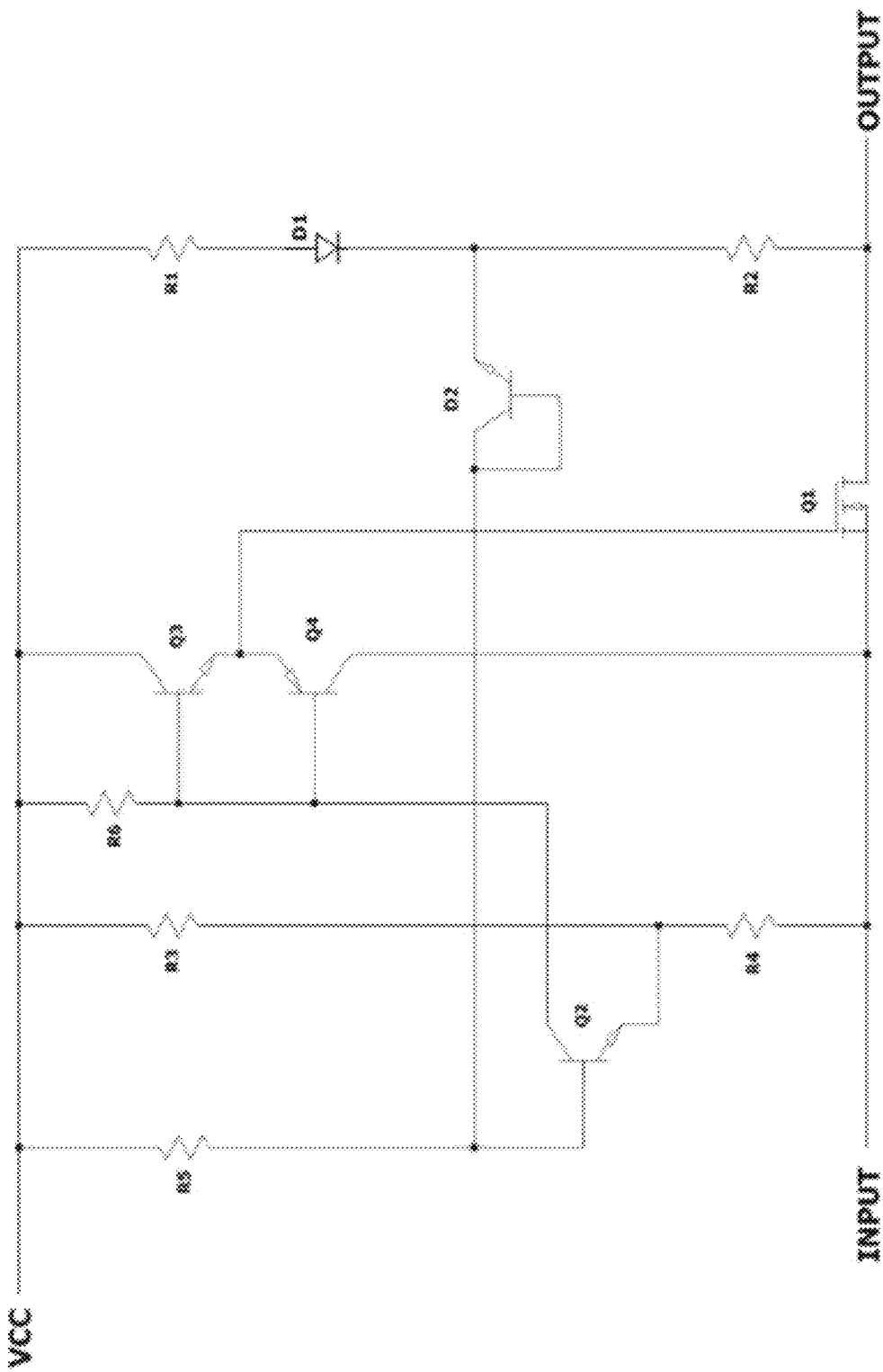

For example, in FIG. 14, the bipolar transistor pair of Q3 and Q4 in the FIG. 12A embodiment has been replaced by a single gate driver integrated circuit. In FIG. 15, resistive biasing components in the FIG. 12A embodiment have been replaced by discrete voltage sources, such as may be available from elsewhere in an integrated system e.g. as bus voltages and/or the like, to reduce component counts and cost. In FIG. 16, biasing resistors for the circuit transistors in the FIG. 12A embodiment have been replaced with current sources feeding Zener diodes to produce bias voltages with voltage regulation provided by the Zener diodes. In FIGS. 17 and 18, blocking diode D2 of the FIG. 12A embodiment has been replaced by transistors with, respectively, base-emitter and collector-base connections. In the FIGS. 17 and 18 example embodiments, which are diode electrical equivalents, such replacement can provide advantages in particular practical applications, where common heat sinking with other components is desirable to match thermal characteristics of semiconductors in the circuit, or to utilize specific performance attributes from power bipolar transistors that may not be available in discrete conventional diodes.

Beyond the illustrated embodiments, active components, such as field effect transistor Q1, may be replaceable with functionally equivalent devices due to advances in device technology, for application-specific reasons for parts availability and/or the like. For example, Q1 may be replaced by alternate SiC or GaN or other FET compositions, or by a bipolar transistor with suitable current capability and with appropriate biasing changes, or even by a relay and/or other discrete switching component if suitable connections for precise measurement of the voltage drop across the relay/switch contacts or a measure of relay/switch current direction can be made. Further embodiments of the reverse current limiter circuits described herein may comprise component replacements and functional representations; the described example embodiments should not be taken as limiting the possible implementations or scope of the present invention.

FIG. 6 described above depicts a low-side reverse current limiter. Low-side reverse current limiters can have many of the same characteristics and variations as the high-side emitters described herein in conjunction with FIGS. 11-18.

ASPECTS OF THE INVENTION

The invention has a number of non-limiting aspects. Non-limiting aspects of the invention include, without limitation:

1. An electrical transmission safety system for connection of direct current (DC) power from a DC power source to a load, the system comprising:
   a connection from the power source to the load, the connection comprising a positive terminal and a negative terminal;
   a first solid state switch electrically connected between the power source and one of the positive terminal and negative terminal; and
   a switch-control isolation block comprising a first optocoupler, the first optocoupler providing electrical isolation from the power source for generating a first isolated switch-control signal in response to a switch-control input signal, the switch-control isolation block connected to provide the first isolated switch-control signal to the first solid state switch to thereby control an ON or OFF conduction state of the first solid state switch and corresponding current flow between the power source and the load through the one of the positive terminal and negative terminal.
2. The electrical transmission safety system of aspect 1 or any other aspect herein comprising a second solid state switch electrically connected between the power source and the other one of the positive terminal and negative terminal.
3. The electrical transmission safety system of aspect 2 or any other aspect herein wherein the switch-control isolation block is configured to generate a second isolated switch-control signal in response to the switch-control input signal and connected to provide the second isolated switch-control signal to the second solid state switch to thereby control an ON or OFF conduction state of the second solid state switch and corresponding current flow between the power source and the load through the other one of the positive terminal and negative terminal.
4. The electrical transmission safety system of any one of aspects 1 to 3 or any other aspect herein wherein:
    the connection between the power source and the load is effected by a releasably connectable cable; and
    the switch-control input signal is provided to the switch-control isolation block in response to the releasably connectable cable being physically connected to or physically disconnected from the load.
5. The electrical transmission safety system of aspect 4 or any other aspect herein wherein physical disconnection of the releasably connectable cable from the load disrupts the switch-control input signal, thereby causing the switch-control isolation block to cause the first isolated switch-control signal to turn the first solid state switch to an OFF (non-conducting) state.
6. The electrical transmission safety system of any one of aspects 4 to 5 or any other aspect herein wherein the switch-control input signal is received at the switch-control isolation block via the releasably connectable cable.
7. The electrical transmission safety system of aspect 6 or any other aspect herein wherein the switch-control input signal is received at the switch-control isolation block from the load.
8. The electrical transmission safety system of any one of aspects 1 to 7 or any other aspect herein wherein a detected presence of a person within an unsafe space disrupts the switch-control input signal, thereby causing the switch-control isolation block to cause the first isolated switch-control signal to turn the first solid state switch to an OFF (non-conducting) state.
9. The electrical transmission safety system of any one of aspects 1 to 8 or any other aspect herein wherein a detection of a problematic state by a switch, camera or sensor disrupts the switch-control input signal, thereby causing the switch-control isolation block to cause the first isolated switch-control signal to turn the first solid state switch to an OFF (non-conducting) state.
10. A photovoltaic array circuit comprising:
    a first electrical transmission safety system for connection of a first photovoltaic cell to a load, the first electrical transmission safety system comprising:
        a first connection from the first photovoltaic cell to the load, the first connection comprising a positive terminal;
        a first solid state switch electrically connected between the first photovoltaic cell and the positive terminal; and
        a first switch-control isolation block comprising a first optocoupler, the first optocoupler providing electrical isolation from the first photovoltaic cell for generating a first isolated switch-control signal in response to a switch-control input signal, the first switch-control isolation block connected to provide the first isolated switch-control signal to the first solid state switch to thereby control an ON or OFF conduction state of the first solid state switch and corresponding current flow between the first photovoltaic cell and the load through the positive terminal;
    a second electrical transmission safety system for connection of a second photovoltaic cell to the load, the second electrical transmission safety system comprising:
        a second connection from the second photovoltaic cell to the load, the second connection comprising a negative terminal;
        a second solid state switch electrically connected between the second photovoltaic cell and the negative terminal; and
        a second switch-control isolation block comprising a second optocoupler, the second optocoupler providing electrical isolation from the second photovoltaic cell for generating a second isolated switch-control signal in response to the switch-control input signal, the second switch-control isolation block connected to provide the second isolated switch-control signal to the second solid state switch to thereby control an ON or OFF conduction state of the second solid state switch and corresponding current flow between the second photovoltaic cell and the load through the negative terminal;
    the first photovoltaic cell connected to output a first DC potential between a first positive node connected to the first solid state switch on a side of the first solid state switch opposite the positive terminal and a first negative node;
    the second photovoltaic cell connected to output a second DC potential between a second negative node connected to the second solid state switch on a side of the second solid state switch opposite the negative terminal and a second positive node; and
    the first negative node electrically connected to the second positive node.
11. The photovoltaic array circuit of aspect 10 or any other aspect herein comprising a low-side reverse current limiter circuit connected between the second solid state switch and the negative terminal to prevent reverse current flow between the second solid state switch and the negative terminal (e.g. reverse current flow from the second solid state switch to the negative terminal).
12. The photovoltaic array circuit of any one of aspects 10 to 11 or any other aspect herein comprising a high-side reverse current limiter circuit connected between the first solid state switch and the positive terminal to prevent reverse current flow between the first solid state switch and the positive terminal (e.g. reverse current flow from the positive terminal to the first solid state switch).
13. The photovoltaic array circuit of any one of aspects 10 to 12 or any other aspect herein comprising a low-side reverse current limiter circuit connected between the negative terminal and the load to prevent reverse current flow between the negative terminal and the load (e.g. reverse current flow from the negative terminal to the load).

14. The photovoltaic array circuit of any one of aspects 10 to 13 or any other aspect herein comprising a high-side reverse current limiter circuit connected between the positive terminal and the load to prevent reverse current flow between the positive terminal and the load (e.g. reverse current flow from the load to the positive terminal).

15. The photovoltaic array circuit of aspect 13 or any other aspect herein wherein the low-side reverse current limiter circuit comprises:
   a MOSFET having a drain electrically connected to the negative terminal, a source electrically connected to the load, and a gate electrically connected to an output of a gate driver circuit;
   a first offset voltage source circuit having a positive node, a negative node electrically connected to the MOSFET source and providing a first offset voltage Voffset1;
   a second offset voltage source circuit having a positive node, a negative node electrically connected to the MOSFET drain and providing a second offset voltage Voffset2;
   a first diode having a cathode electrically connected to the positive node of the second offset voltage source circuit; and
   a bipolar transistor having an emitter electrically connected to the positive node of the first offset voltage source circuit, a base electrically connected to the anode of the first diode, and a collector electrically connected to an input of the gate driver circuit;
   wherein the low-side reverse current limiter circuit is configured to regulate or prevent current flow from the negative terminal to the load.

16. The photovoltaic array circuit of aspect 11 or any other aspect herein wherein the low-side reverse current limiter circuit comprises:
   a MOSFET having a drain electrically connected to the second solid state switch, a source electrically connected to the negative terminal and a gate electrically connected to an output of a gate driver circuit;
   a first offset voltage source circuit having a positive node, a negative node electrically connected to the MOSFET source and providing a first offset voltage Voffset1;
   a second offset voltage source circuit having a positive node, a negative node electrically connected to the MOSFET drain and providing a second offset voltage Voffset2;
   a first diode having a cathode electrically connected to the positive node of the second offset voltage source circuit; and
   a bipolar transistor having an emitter electrically connected to the positive node of the first offset voltage source circuit, a base electrically connected to the anode of the first diode, and a collector electrically connected to an input of the gate driver circuit;
   wherein the low-side reverse current limiter circuit is configured to regulate or prevent current flow from the second solid state switch to the negative terminal.

17. The photovoltaic array circuit of aspect 14 or any other aspect herein wherein the high-side reverse current limiter circuit comprises:
   a MOSFET having a drain electrically connected to the load, a source electrically connected to the positive terminal, and a gate electrically connected to an output of a gate driver circuit;
   a first offset voltage source circuit having a positive node, a negative node electrically connected to the MOSFET source and providing a first offset voltage Voffset1;
   a second offset voltage source circuit having a positive node, a negative node electrically connected to the MOSFET drain and providing a second offset voltage Voffset2;
   a first diode having a cathode electrically connected to the positive node of the second offset voltage source circuit; and
   a bipolar transistor having an emitter electrically connected to the positive node of the first offset voltage source circuit, a base electrically connected to the anode of the first diode, and a collector electrically connected to an input of the gate driver circuit;
   wherein the high-side reverse current limiter circuit is configured to regulate or prevent current flow from the load to the positive terminal.

18. The photovoltaic array circuit of aspect 12 or any other aspect herein wherein the high-side reverse current limiter circuit comprises:
   a MOSFET having a drain electrically connected to the positive terminal, a source electrically connected to the first solid state switch, and a gate electrically connected to an output of a gate driver circuit;
   a first offset voltage source circuit having a positive node, a negative node electrically connected to the MOSFET source and providing a first offset voltage Voffset1;
   a second offset voltage source circuit having a positive node, a negative node electrically connected to the MOSFET drain and providing a second offset voltage Voffset2;
   a first diode having a cathode electrically connected to the positive node of the second offset voltage source circuit; and
   a bipolar transistor having an emitter electrically connected to the positive node of the first offset voltage source circuit, a base electrically connected to the anode of the first diode, and a collector electrically connected to an input of the gate driver circuit;
   wherein the high-side reverse current limiter circuit is configured to regulate or prevent current flow from the positive terminal to the first solid state switch.

19. The photovoltaic array circuit of any one of aspects 15 to 18 or any other aspect herein wherein regulation of the reverse current is based at least in part on the first and second offset voltages Voffset1 and Voffset2.

20. The photovoltaic array circuit of any one of aspects 15 to 19 or any other aspect herein wherein the MOSFET has an equivalent impedance Rdson and equivalent voltage Vdson between its drain and source when the MOSFET is in a conducting state.

21. The photovoltaic array circuit of any one of aspects 15 to 20 or any other aspect herein wherein at lease one of the first and second offset voltages Voffset1 and Voffset2 I configurable based at least in part on selection of one or more resistance values in at least one of the first and second offset voltage source circuits.

22. The photovoltaic array circuit of any one of aspects 10 to 21 or any other aspect herein wherein:
   the first connection from the first photovoltaic cell to the load and the second connection from the second photovoltaic cell to the load are effected by a releasably connectable cable; and
the switch-control input signal is provided to the first and second switch-control isolation blocks in response to (e.g. only after) the releasably connectable cable is physically connected to or physically disconnected from the load.
23. The photovoltaic array circuit of aspect 22 or any other aspect herein wherein physical disconnection of the releasably connectable cable from the load disrupts the switch-control input signal, thereby causing the first and second switch-control isolation blocks to cause the first and second isolated switch-control signals to turn the first and second solid state switches to their OFF (non-conducting) states.
24. The photovoltaic array circuit of any one of aspects 22 to 23 or any other aspect herein wherein the switch-control input signal is received at the first and second switch-control isolation blocks via the releasably connectable cable.
25. The photovoltaic array circuit of aspect 24 or any other aspect herein wherein the switch-control input signal is received at the first and second switch-control isolation blocks from the load.
26. The photovoltaic array circuit of any one of aspects 10 to 25 or any other aspect herein wherein a detected presence of a person within an unsafe space disrupts the switch-control input signal, thereby causing the first and second switch-control isolation blocks to cause the first and second isolated switch-control signals to turn the first and second solid state switches to their OFF (non-conducting) states.
27. The photovoltaic array circuit of any one of aspects 10 to 26 or any other aspect herein wherein a detection of a problematic state by a switch, camera or sensor disrupts the switch-control input signal, thereby causing the first and second switch-control isolation blocks to cause the first and second isolated switch-control signals to turn the first and second solid state switches to their OFF (non-conducting) states.
28. A portable solar charging system comprising a plurality of photovoltaic array circuits according to any one of aspects 10 to 27 or any other aspect herein connected in parallel between the positive terminal and the negative terminal.
29. An electrical transmission safety system for connection of direct current (DC) power from a DC power source to a load, the system comprising:
a connection from the power source to the load, the connection comprising a positive terminal and a negative terminal;
a first solid state switch electrically connected between the power source and one of the positive terminal and negative terminal; and
a switch-control isolation block for generating a first isolated switch-control signal in response to a switch-control input signal, the switch-control isolation block connected to provide the first isolated switch-control signal to the first solid state switch to thereby control an ON or OFF conduction state of the first solid state switch and corresponding current flow between the power source and the load through the one of the positive terminal and negative terminal;
wherein the switch-control isolation block receives the switch-control input signal from the load.
30. The electrical transmission safety system of aspect 29 or any other aspect herein comprising a second solid state switch electrically connected between the power source and the other one of the positive terminal and negative terminal.
31. The electrical transmission safety system of aspect 30 or any other aspect herein wherein the switch-control isolation block is configured to generate a second isolated switch-control signal in response to the switch-control input signal and connected to provide the second isolated switch-control signal to the second solid state switch to thereby control an ON or OFF conduction state of the second solid state switch and corresponding current flow between the power source and the load through the other one of the positive terminal and negative terminal.
32. The electrical transmission safety system of any one of aspects 29 to 31 or any other aspect herein wherein:
the connection between the power source and the load is effected by a releasably connectable cable; and
the switch-control input signal is provided to the switch-control isolation block in response to the releasably connectable cable being physically connected to or disconnected from the load.
33. The electrical transmission safety system of aspect 32 or any other aspect herein wherein physical disconnection of the releasably connectable cable from the load disrupts the switch-control input signal, thereby causing the switch-control isolation block to cause the first isolated switch-control signal to turn the first solid state switch to an OFF (non-conducting) state.
34. The electrical transmission safety system of any one of aspects 32 to 33 or any other aspect herein wherein the switch-control input signal is received at the switch-control isolation block via the releasably connectable cable.
35. The electrical transmission safety system of any one of aspects 29 to 34 or any other aspect herein wherein a detected presence of a person within an unsafe space disrupts the switch-control input signal, thereby causing the switch-control isolation block to cause the first isolated switch-control signal to turn the first solid state switch to an OFF (non-conducting) state.
36. The electrical transmission safety system of any one of aspects 29 to 35 or any other aspect herein wherein a detection of a problematic state by a switch, camera or sensor disrupts the switch-control input signal, thereby causing the switch-control isolation block to cause the first isolated switch-control signal to turn the first solid state switch to an OFF (non-conducting) state.
37. A photovoltaic array circuit comprising:
a first electrical transmission safety system for connection of a first photovoltaic cell to a load, the first electrical transmission safety system comprising:
a first connection from the first photovoltaic cell to the load, the first connection comprising a positive terminal;
a first solid state switch electrically connected between the first photovoltaic cell and the positive terminal; and
a first switch-control isolation block for generating a first isolated switch-control signal in response to a switch-control input signal, the first switch-control isolation block connected to provide the first isolated switch-control signal to the first solid state switch to thereby control an ON or OFF conduction state of the first solid state switch and corresponding current flow between the first photovoltaic cell and the load through the positive terminal;

a second electrical transmission safety system for connection of a second photovoltaic cell to the load, the second electrical transmission safety system comprising:
  a second connection from the second photovoltaic cell to the load, the second connection comprising a negative terminal;
  a second solid state switch electrically connected between the second photovoltaic cell and the negative terminal; and
  a second switch-control isolation block for generating a second isolated switch-control signal in response to the switch-control input signal, the second switch-control isolation block connected to provide the second isolated switch-control signal to the second solid state switch to thereby control an ON or OFF conduction state of the second solid state switch and corresponding current flow between the second photovoltaic cell and the load through the negative terminal;

the first photovoltaic cell connected to output a first DC potential between a first positive node connected to the first solid state switch on a side of the first solid state switch opposite the positive terminal and a first negative node;

the second photovoltaic cell connected to output a second DC potential between a second negative node connected to the second solid state switch on a side of the second solid state switch opposite the negative terminal and a second positive node;

the first negative node electrically connected to the second positive node; and wherein the first and second switch-control isolation blocks receive the switch-control input signal from the load.

38. The photovoltaic array circuit of aspect 37 or any other aspect herein comprising a low-side reverse current limiter circuit connected between the second solid state switch and the negative terminal to prevent reverse current flow between the second solid state switch and the negative terminal (e.g. reverse current flow from the second solid state switch to the negative terminal).

39. The photovoltaic array circuit of any one of aspects 37 to 38 or any other aspect herein comprising a high-side reverse current limiter circuit connected between the first solid state switch and the positive terminal to prevent reverse current flow between the first solid state switch and the positive terminal (e.g. reverse current flow from the positive terminal to the first solid state switch).

40. The photovoltaic array circuit of any one of aspects 37 to 39 or any other aspect herein comprising a low-side reverse current limiter circuit connected between the negative terminal and the load to prevent reverse current flow between the negative terminal and the load (e.g. reverse current flow from the negative terminal to the load).

41. The photovoltaic array circuit of any one of aspects 37 to 40 or any other aspect herein comprising a high-side reverse current limiter circuit connected between the positive terminal and the load to prevent reverse current flow between the positive terminal and the load (e.g. reverse current flow from the load to the positive terminal).

42. The photovoltaic array circuit of aspect 40 or any other aspect herein wherein the low-side reverse current limiter circuit comprises:
  a MOSFET having a drain electrically connected to the negative terminal, a source electrically connected to the load, and a gate electrically connected to an output of a gate driver circuit;
  a first offset voltage source circuit having a positive node, a negative node electrically connected to the MOSFET source and providing a first offset voltage Voffset1;
  a second offset voltage source circuit having a positive node, a negative node electrically connected to the MOSFET drain and providing a second offset voltage Voffset2;
  a first diode having a cathode electrically connected to the positive node of the second offset voltage source circuit; and
  a bipolar transistor having an emitter electrically connected to the positive node of the first offset voltage source circuit, a base electrically connected to the anode of the first diode, and a collector electrically connected to an input of the gate driver circuit;
  wherein the low-side reverse current limiter circuit is configured to regulate or prevent current flow from the negative terminal to the load.

43. The photovoltaic array circuit of aspect 38 or any other aspect herein wherein the low-side reverse current limiter circuit comprises:
  a MOSFET having a drain electrically connected to the second solid state switch, a source electrically connected to the negative terminal and a gate electrically connected to an output of a gate driver circuit;
  a first offset voltage source circuit having a positive node, a negative node electrically connected to the MOSFET source and providing a first offset voltage Voffset1;
  a second offset voltage source circuit having a positive node, a negative node electrically connected to the MOSFET drain and providing a second offset voltage Voffset2;
  a first diode having a cathode electrically connected to the positive node of the second offset voltage source circuit; and
  a bipolar transistor having an emitter electrically connected to the positive node of the first offset voltage source circuit, a base electrically connected to the anode of the first diode, and a collector electrically connected to an input of the gate driver circuit;
  wherein the low-side reverse current limiter circuit is configured to regulate or prevent current flow from the second solid state switch to the negative terminal.

44. The photovoltaic array circuit of aspect 41 or any other aspect herein wherein the high-side reverse current limiter circuit comprises:
  a MOSFET having a drain electrically connected to the load, a source electrically connected to the positive terminal, and a gate electrically connected to an output of a gate driver circuit;
  a first offset voltage source circuit having a positive node, a negative node electrically connected to the MOSFET source and providing a first offset voltage Voffset1;

a second offset voltage source circuit having a positive node, a negative node electrically connected to the MOSFET drain and providing a second offset voltage Voffset2;

a first diode having a cathode electrically connected to the positive node of the second offset voltage source circuit; and a bipolar transistor having an emitter electrically connected to the positive node of the first offset voltage source circuit, a base electrically connected to the anode of the first diode, and a collector electrically connected to an input of the gate driver circuit;

wherein the high-side reverse current limiter circuit is configured to regulate or prevent current flow from the load to the positive terminal.

45. The photovoltaic array circuit of aspect 39 or any other aspect herein wherein the high-side reverse current limiter circuit comprises:

a MOSFET having a drain electrically connected to the positive terminal, a source electrically connected to the first solid state switch, and a gate electrically connected to an output of a gate driver circuit;

a first offset voltage source circuit having a positive node, a negative node electrically connected to the MOSFET source and providing a first offset voltage Voffset1;

a second offset voltage source circuit having a positive node, a negative node electrically connected to the MOSFET drain and providing a second offset voltage Voffset2;

a first diode having a cathode electrically connected to the positive node of the second offset voltage source circuit; and a bipolar transistor having an emitter electrically connected to the positive node of the first offset voltage source circuit, a base electrically connected to the anode of the first diode, and a collector electrically connected to an input of the gate driver circuit;

wherein the high-side reverse current limiter circuit is configured to regulate or prevent current flow from the positive terminal to the first solid state switch.

46. The photovoltaic array circuit of any one of aspects 42 to 45 or any other aspect herein wherein regulation of the reverse current is based at least in part on the first and second offset voltages Voffset1 and Voffset2.

47. The photovoltaic array circuit of any one of aspects 42 to 46 or any other aspect herein wherein the MOSFET has an equivalent impedance Rdson and equivalent voltage Vdson between its drain and source when the MOSFET is in a conducting state.

48. The photovoltaic array circuit of any one of aspects 42 to 47 or any other aspect herein wherein at lease one of the first and second offset voltages Voffset1 and Voffset2 I configurable based at least in part on selection of one or more resistance values in at least one of the first and second offset voltage source circuits.

49. The photovoltaic array circuit of any one of aspects 37 to 48 or any other aspect herein wherein:

the first connection from the first photovoltaic cell to the load and the second connection from the second photovoltaic cell to the load are effected by a releasably connectable cable; and the switch-control input signal is provided to the first and second switch-control isolation blocks in response to (e.g. only after) the releasably connectable cable is physically connected to or physically disconnected from the load.

50. The photovoltaic array circuit of aspect 49 or any other aspect herein wherein physical disconnection of the releasably connectable cable from the load disrupts the switch-control input signal, thereby causing the first and second switch-control isolation blocks to cause the first and second isolated switch-control signals to turn the first and second solid state switches to their OFF (non-conducting) states.

51. The photovoltaic array circuit of any one of aspects 49 to 50 or any other aspect herein wherein the switch-control input signal is received at the first and second switch-control isolation blocks via the releasably connectable cable.

52. The photovoltaic array circuit of any one of aspects 37 to 51 or any other aspect herein wherein a detected presence of a person within an unsafe space disrupts the switch-control input signal, thereby causing the first and second switch-control isolation blocks to cause the first and second isolated switch-control signals to turn the first and second solid state switches to their OFF (non-conducting) states.

53. The photovoltaic array circuit of any one of aspects 37 to 52 or any other aspect herein wherein a detection of a problematic state by a switch, camera or sensor disrupts the switch-control input signal, thereby causing the first and second switch-control isolation blocks to cause the first and second isolated switch-control signals to turn the first and second solid state switches to their OFF (non-conducting) states.

54. A method for connecting a photovoltaic array to and disconnecting a photovoltaic array from a load, the method comprising:

connecting a first photovoltaic cell to a positive terminal of the load via a first electrical transmission safety system, the first electrical transmission safety system comprising: a first solid state switch electrically connected between the first photovoltaic cell and the positive terminal; and a first switch-control isolation block comprising a first optocoupler, the first optocoupler providing electrical isolation from the first photovoltaic cell for generating a first isolated switch-control signal in response to a switch-control input signal, the first switch-control isolation block connected to provide the first isolated switch-control signal to the first solid state switch to thereby control an ON or OFF conduction state of the first solid state switch and corresponding current flow between the first photovoltaic cell and the load through the positive terminal;

connecting a second photovoltaic cell to a negative terminal of the load via a second electrical transmission safety system, the second electrical transmission safety system comprising: a second solid state switch electrically connected between the second photovoltaic cell and the negative terminal; and a second switch-control isolation block comprising a second optocoupler, the second optocoupler providing electrical isolation from the second photovoltaic cell for generating a second isolated switch-control signal in response to the switch-control input signal, the second switch-control isolation block connected to provide the second isolated switch-control signal to the second solid state switch to thereby control an ON or OFF conduction state of the second solid state switch and corresponding current flow between the second photovoltaic cell and the load through the negative terminal;

connecting the first photovoltaic cell to output a first DC potential between a first positive node connected to the first solid state switch on a side of the first solid state switch opposite the positive terminal and a first negative node;

connecting the second photovoltaic cell to output a second DC potential between a second negative node connected to the second solid state switch on a side of the second solid state switch opposite the negative terminal and a second positive node; and electrically connecting the first negative node to the second positive node.

55. The method of aspect 54 comprising method steps corresponding to any of the features (e.g. connections and/or other features) of any other aspects recited herein.

56. Apparatus comprising any features, combinations of features and/or sub-combinations of features disclosed herein.

57. Methods comprising any features, combinations of features and/or sub-combinations of features disclosed herein.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

For example, while processes or blocks are presented in a given order, alternative examples may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times.

In addition, while elements are at times shown as being performed sequentially, they may instead be performed simultaneously or in different sequences. It is therefore intended that the following claims are interpreted to include all such variations as are within their intended scope.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. An electrical transmission safety system for connection of direct current (DC) power from a DC power source to a load, the system comprising:

a connection from the power source to the load, the connection comprising a positive terminal and a negative terminal;

a first solid state switch electrically connected between the power source and one of the positive terminal and negative terminal; and a switch-control isolation block comprising a first optocoupler, the first optocoupler providing electrical isolation from the power source for generating a first isolated switch-control signal in response to a switch-control input signal, the switch-control isolation block connected to provide the first isolated switch-control signal to the first solid state switch to thereby control an ON or OFF conduction state of the first solid state switch and corresponding current flow between the power source and the load through the one of the positive terminal and negative terminal;

wherein the connection between the power source and the load is effected by a releasably connectable cable;

wherein the switch-control input signal is provided to the switch-control isolation block in response to the releasably connectable cable being physically connected to or physically disconnected from the load;

wherein the switch-control input signal is received at the switch-control isolation block via the releasably connectable cable; and wherein the switch-control input signal is received at the switch-control isolation block from the load.

2. An electrical transmission safety system for connection of direct current (DC) power from a DC power source to a load, the system comprising:
- a connection from the power source to the load, the connection comprising a positive terminal and a negative terminal;
- a first solid state switch electrically connected between the power source and one of the positive terminal and negative terminal; and
- a switch-control isolation block comprising a first optocoupler, the first optocoupler providing electrical isolation from the power source for generating a first isolated switch-control signal in response to a switch-control input signal, the switch-control isolation block connected to provide the first isolated switch-control signal to the first solid state switch to thereby control an ON or OFF conduction state of the first solid state switch and corresponding current flow between the power source and the load through the one of the positive terminal and negative terminal;
- wherein a detected presence of a person within an unsafe space disrupts the switch-control input signal, thereby causing the switch-control isolation block to cause the first isolated switch-control signal to turn the first solid state switch to an OFF (non-conducting) state.

3. An electrical transmission safety system for connection of direct current (DC) power from a DC power source to a load, the system comprising:
- a connection from the power source to the load, the connection comprising a positive terminal and a negative terminal;
- a first solid state switch electrically connected between the power source and one of the positive terminal and negative terminal; and
- a switch-control isolation block comprising a first optocoupler, the first optocoupler providing electrical isolation from the power source for generating a first isolated switch-control signal in response to a switch-control input signal, the switch-control isolation block connected to provide the first isolated switch-control signal to the first solid state switch to thereby control an ON or OFF conduction state of the first solid state switch and corresponding current flow between the power source and the load through the one of the positive terminal and negative terminal;
- wherein a detection of a problematic state by a switch, camera or sensor disrupts the switch-control input signal, thereby causing the switch-control isolation block to cause the first isolated switch-control signal to turn the first solid state switch to an OFF (non-conducting) state.

4. A photovoltaic array circuit comprising:
- a first electrical transmission safety system for connection of a first photovoltaic cell to a load, the first electrical transmission safety system comprising:
  - a first connection from the first photovoltaic cell to the load, the first connection comprising a positive terminal;
  - a first solid state switch electrically connected between the first photovoltaic cell and the positive terminal; and
  - a first switch-control isolation block comprising a first optocoupler, the first optocoupler providing electrical isolation from the first photovoltaic cell for generating a first isolated switch-control signal in response to a switch-control input signal, the first switch-control isolation block connected to provide the first isolated switch-control signal to the first solid state switch to thereby control an ON or OFF conduction state of the first solid state switch and corresponding current flow between the first photovoltaic cell and the load through the positive terminal;
- a second electrical transmission safety system for connection of a second photovoltaic cell to the load, the second electrical transmission safety system comprising:
  - a second connection from the second photovoltaic cell to the load, the second connection comprising a negative terminal;
  - a second solid state switch electrically connected between the second photovoltaic cell and the negative terminal; and
  - a second switch-control isolation block comprising a second optocoupler, the second optocoupler providing electrical isolation from the second photovoltaic cell for generating a second isolated switch-control signal in response to the switch-control input signal, the second switch-control isolation block connected to provide the second isolated switch-control signal to the second solid state switch to thereby control an ON or OFF conduction state of the second solid state switch and corresponding current flow between the second photovoltaic cell and the load through the negative terminal;
- the first photovoltaic cell connected to output a first DC potential between a first positive node connected to the first solid state switch on a side of the first solid state switch opposite the positive terminal and a first negative node;
- the second photovoltaic cell connected to output a second DC potential between a second negative node connected to the second solid state switch on a side of the second solid state switch opposite the negative terminal and a second positive node; and
- the first negative node electrically connected to the second positive node.

5. The photovoltaic array circuit of claim 4 comprising a low-side reverse current limiter circuit connected between the second solid state switch and the negative terminal to prevent reverse current flow between the second solid state switch and the negative terminal (e.g. reverse current flow from the second solid state switch to the negative terminal).

6. The photovoltaic array circuit of claim 4 comprising a high-side reverse current limiter circuit connected between the first solid state switch and the positive terminal to prevent reverse current flow between the first solid state switch and the positive terminal (e.g. reverse current flow from the positive terminal to the first solid state switch).

7. The photovoltaic array circuit of claim 4 comprising a low-side reverse current limiter circuit connected between the negative terminal and the load to prevent reverse current flow between the negative terminal and the load (e.g. reverse current flow from the negative terminal to the load).

8. The photovoltaic array circuit of claim 4 comprising a high-side reverse current limiter circuit connected between the positive terminal and the load to prevent reverse current flow between the positive terminal and the load (e.g. reverse current flow from the load to the positive terminal).

9. The photovoltaic array circuit of claim 7 wherein the low-side reverse current limiter circuit comprises:
    a MOSFET having a drain electrically connected to the negative terminal, a source electrically connected to the load, and a gate electrically connected to an output of a gate driver circuit;
    a first offset voltage source circuit having a positive node, a negative node electrically connected to the MOSFET source and providing a first offset voltage Voffset1;
    a second offset voltage source circuit having a positive node, a negative node electrically connected to the MOSFET drain and providing a second offset voltage Voffset2;
    a first diode having a cathode electrically connected to the positive node of the second offset voltage source circuit; and
a bipolar transistor having an emitter electrically connected to the positive node of the first offset voltage source circuit, a base electrically connected to the anode of the first diode, and a collector electrically connected to an input of the gate driver circuit;
wherein the low-side reverse current limiter circuit is configured to regulate or prevent current flow from the negative terminal to the load.

10. The photovoltaic array circuit of claim 5 wherein the low-side reverse current limiter circuit comprises:
    a MOSFET having a drain electrically connected to the second solid state switch, a source electrically connected to the negative terminal and a gate electrically connected to an output of a gate driver circuit;
    a first offset voltage source circuit having a positive node, a negative node electrically connected to the MOSFET source and providing a first offset voltage Voffset1;
    a second offset voltage source circuit having a positive node, a negative node electrically connected to the MOSFET drain and providing a second offset voltage Voffset2;
    a first diode having a cathode electrically connected to the positive node of the second offset voltage source circuit; and
    a bipolar transistor having an emitter electrically connected to the positive node of the first offset voltage source circuit, a base electrically connected to the anode of the first diode, and a collector electrically connected to an input of the gate driver circuit;
    wherein the low-side reverse current limiter circuit is configured to regulate or prevent current flow from the second solid state switch to the negative terminal.

11. The photovoltaic array circuit of claim 8 wherein the high-side reverse current limiter circuit comprises:
    a MOSFET having a drain electrically connected to the load, a source electrically connected to the positive terminal, and a gate electrically connected to an output of a gate driver circuit;
    a first offset voltage source circuit having a positive node, a negative node electrically connected to the MOSFET source and providing a first offset voltage Voffset1;
    a second offset voltage source circuit having a positive node, a negative node electrically connected to the MOSFET drain and providing a second offset voltage Voffset2;
    a first diode having a cathode electrically connected to the positive node of the second offset voltage source circuit; and
    a bipolar transistor having an emitter electrically connected to the positive node of the first offset voltage source circuit, a base electrically connected to the anode of the first diode, and a collector electrically connected to an input of the gate driver circuit;
wherein the high-side reverse current limiter circuit is configured to regulate or prevent current flow from the load to the positive terminal.

12. The photovoltaic array circuit of claim 6 wherein the high-side reverse current limiter circuit comprises:
    a MOSFET having a drain electrically connected to the positive terminal, a source electrically connected to the first solid state switch, and a gate electrically connected to an output of a gate driver circuit;
    a first offset voltage source circuit having a positive node, a negative node electrically connected to the MOSFET source and providing a first offset voltage Voffset1;
    a second offset voltage source circuit having a positive node, a negative node electrically connected to the MOSFET drain and providing a second offset voltage Voffset2;
    a first diode having a cathode electrically connected to the positive node of the second offset voltage source circuit; and
    a bipolar transistor having an emitter electrically connected to the positive node of the first offset voltage source circuit, a base electrically connected to the anode of the first diode, and a collector electrically connected to an input of the gate driver circuit;
        wherein the high-side reverse current limiter circuit is configured to regulate or prevent current flow from the positive terminal to the first solid state switch.

13. The photovoltaic array circuit of claim 9 wherein regulation of the reverse current is based at least in part on the first and second offset voltages Voffset1 and Voffset2.

14. The photovoltaic array circuit of claim 9 wherein the MOSFET has an equivalent impedance Rdson and equivalent voltage Vdson between its drain and source when the MOSFET is in a conducting state.

15. A method for connecting a photovoltaic array to and disconnecting a photovoltaic array from a load, the method comprising:
    connecting a first photovoltaic cell to a positive terminal of the load via a first electrical transmission safety system, the first electrical transmission safety system comprising: a first solid state switch electrically connected between the first photovoltaic cell and the positive terminal; and a first switch-control isolation block comprising a first optocoupler, the first optocoupler providing electrical isolation from the first photovoltaic cell for generating a first isolated switch-control signal in response to a switch-control input signal, the first switch-control isolation block connected to provide the first isolated switch-control signal to the first solid state switch to thereby control an ON or OFF conduction state of the first solid state switch and corresponding current flow between the first photovoltaic cell and the load through the positive terminal;

connecting a second photovoltaic cell to a negative terminal of the load via a second electrical transmission safety system, the second electrical transmission safety system comprising: a second solid state switch electrically connected between the second photovoltaic cell and the negative terminal; and a second switch-control isolation block comprising a second optocoupler, the second optocoupler providing electrical isolation from the second photovoltaic cell for generating a second isolated switch-control signal in response to the switch-control input signal, the second switch-control isolation block connected to provide the second isolated switch-control signal to the second solid state switch to thereby control an ON or OFF conduction state of the second solid state switch and corresponding current flow between the second photovoltaic cell and the load through the negative terminal;

connecting the first photovoltaic cell to output a first DC potential between a first positive node connected to the first solid state switch on a side of the first solid state switch opposite the positive terminal and a first negative node;

connecting the second photovoltaic cell to output a second DC potential between a second negative node connected to the second solid state switch on a side of the second solid state switch opposite the negative terminal and a second positive node; and electrically connecting the first negative node to the second positive node.

* * * * *